US011447338B2

(12) United States Patent
Sighinolfi

(10) Patent No.: US 11,447,338 B2
(45) Date of Patent: Sep. 20, 2022

(54) DEVICE FOR GRIPPING SLAB-SHAPED ELEMENTS

(71) Applicant: RAIMONDI S.P.A., Modena (IT)

(72) Inventor: Riccardo Sighinolfi, Rubiera (IT)

(73) Assignee: RAIMONDI S.P.A., Modena (IT)

( * ) Notice: Subject to any disclaimer, the term of this patent is extended or adjusted under 35 U.S.C. 154(b) by 160 days.

(21) Appl. No.: 16/804,759

(22) Filed: Feb. 28, 2020

(65) Prior Publication Data

US 2020/0277140 A1   Sep. 3, 2020

(30) Foreign Application Priority Data

Feb. 28, 2019   (IT) ........................ 102019000002917

(51) Int. Cl.
| | |
|---|---|
| *B65G 49/06* | (2006.01) |
| *B65G 59/04* | (2006.01) |
| *B65H 5/08* | (2006.01) |
| *B65G 7/12* | (2006.01) |

(52) U.S. Cl.
CPC ............ *B65G 7/12* (2013.01); *B65G 49/061* (2013.01); *B65G 49/063* (2013.01); *B65G 59/04* (2013.01); *B65H 5/08* (2013.01); *B65G 2201/022* (2013.01); *B65G 2207/08* (2013.01); *B65G 2249/04* (2013.01)

(58) Field of Classification Search
CPC ...... B65G 7/12; B65G 49/061; B65G 49/063; B65G 59/04; B25J 15/063; B25J 15/0616
USPC ......................................... 294/183, 185, 65
See application file for complete search history.

(56) References Cited

U.S. PATENT DOCUMENTS

| | | | |
|---|---|---|---|
| 5,735,512 A | 4/1998 | Waddell | |
| 6,863,323 B2* | 3/2005 | Neveu ................. | B25J 15/0052 294/65 |
| 7,628,434 B2* | 12/2009 | Bruce .................. | B65G 49/061 294/65 |
| 8,371,631 B2* | 2/2013 | Lin ...................... | B25J 15/0061 294/65 |
| 8,418,341 B1* | 4/2013 | Fisher ................. | B25J 15/0061 29/443 |
| 8,684,418 B2* | 4/2014 | Lin ...................... | B25J 15/0061 285/147.1 |
| 2003/0045881 A1* | 3/2003 | Barouk ................ | A61B 17/863 606/304 |
| 2003/0235491 A1 | 12/2003 | Subotincic | |
| 2009/0297319 A1* | 12/2009 | Kalb .................... | B25J 15/0061 414/751.1 |
| 2016/0268151 A1* | 9/2016 | Li ....................... | H01L 21/67706 |
| 2017/0368692 A1* | 12/2017 | Alonso Ramila .... | B25J 15/0616 |
| 2018/0361621 A1 | 12/2018 | Sighinolfi | |

FOREIGN PATENT DOCUMENTS

| | | |
|---|---|---|
| CN | 106217286 A | 12/2016 |
| DE | 8405069 U1 | 7/1984 |
| DE | 8607854 U1 | 4/1986 |

(Continued)

*Primary Examiner* — Paul T Chin
(74) *Attorney, Agent, or Firm* — Browdy and Neimark, PLLC

(57) ABSTRACT

A gripping device (10) for sheet-shaped elements (L) comprising: at least one longitudinal bar (20) adjustable in length and provided with a plurality of suction gripping members (30) connected along a longitudinal axis (A) of the longitudinal bar (20).

11 Claims, 10 Drawing Sheets

(56) References Cited

FOREIGN PATENT DOCUMENTS

| | | |
|---|---|---|
| DE | 4209935 A1 | 11/1992 |
| DE | 102013105383 B3 | 7/2014 |
| DE | 202014009235 U1 | 2/2015 |
| GB | 2273517 A | 6/1994 |
| WO | 9942244 A1 | 8/1999 |

\* cited by examiner

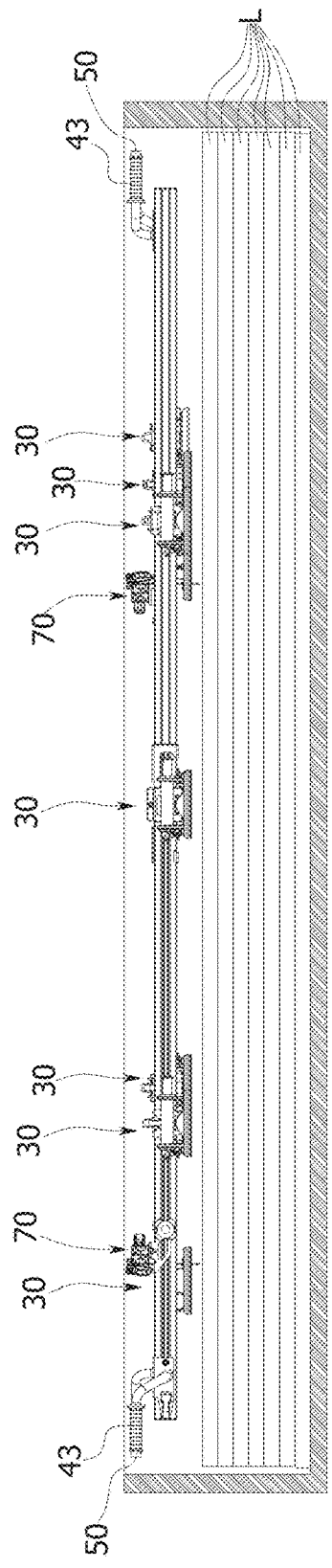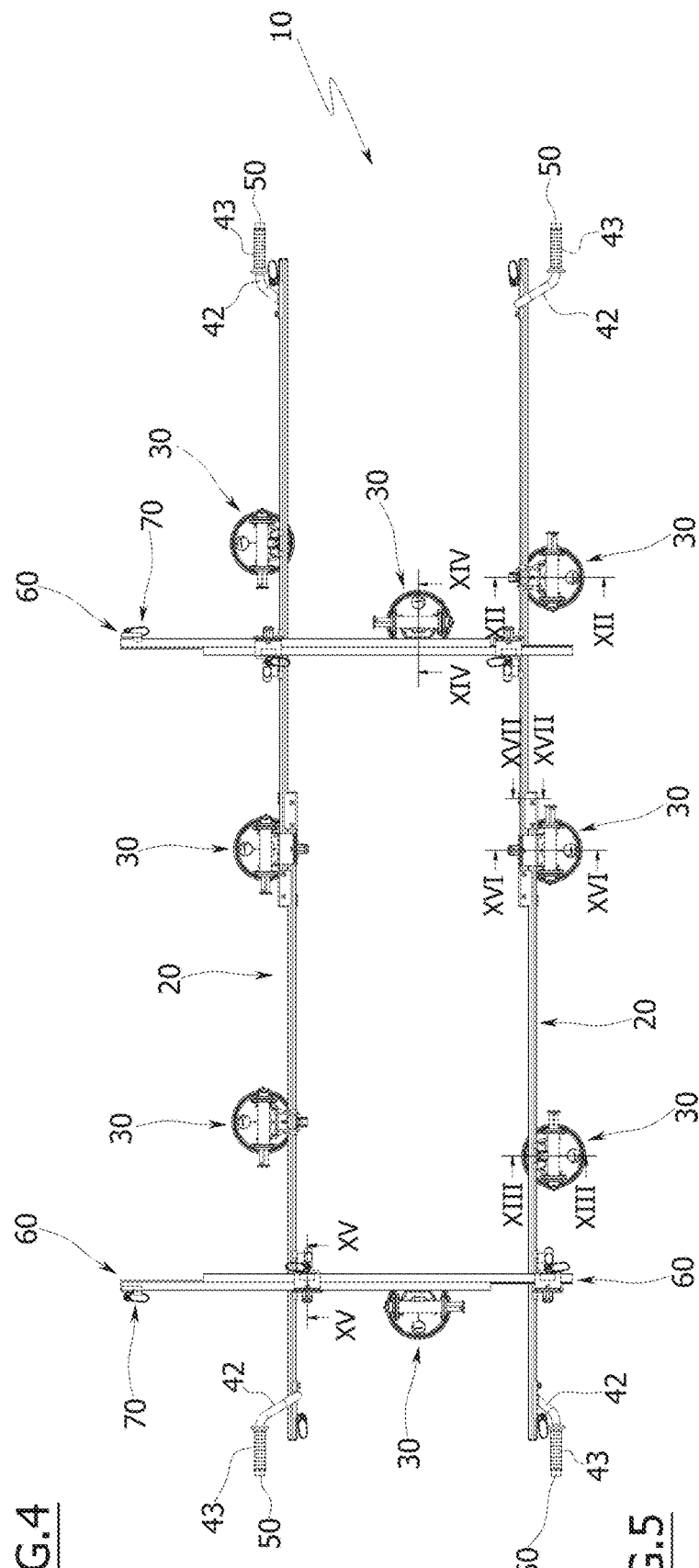

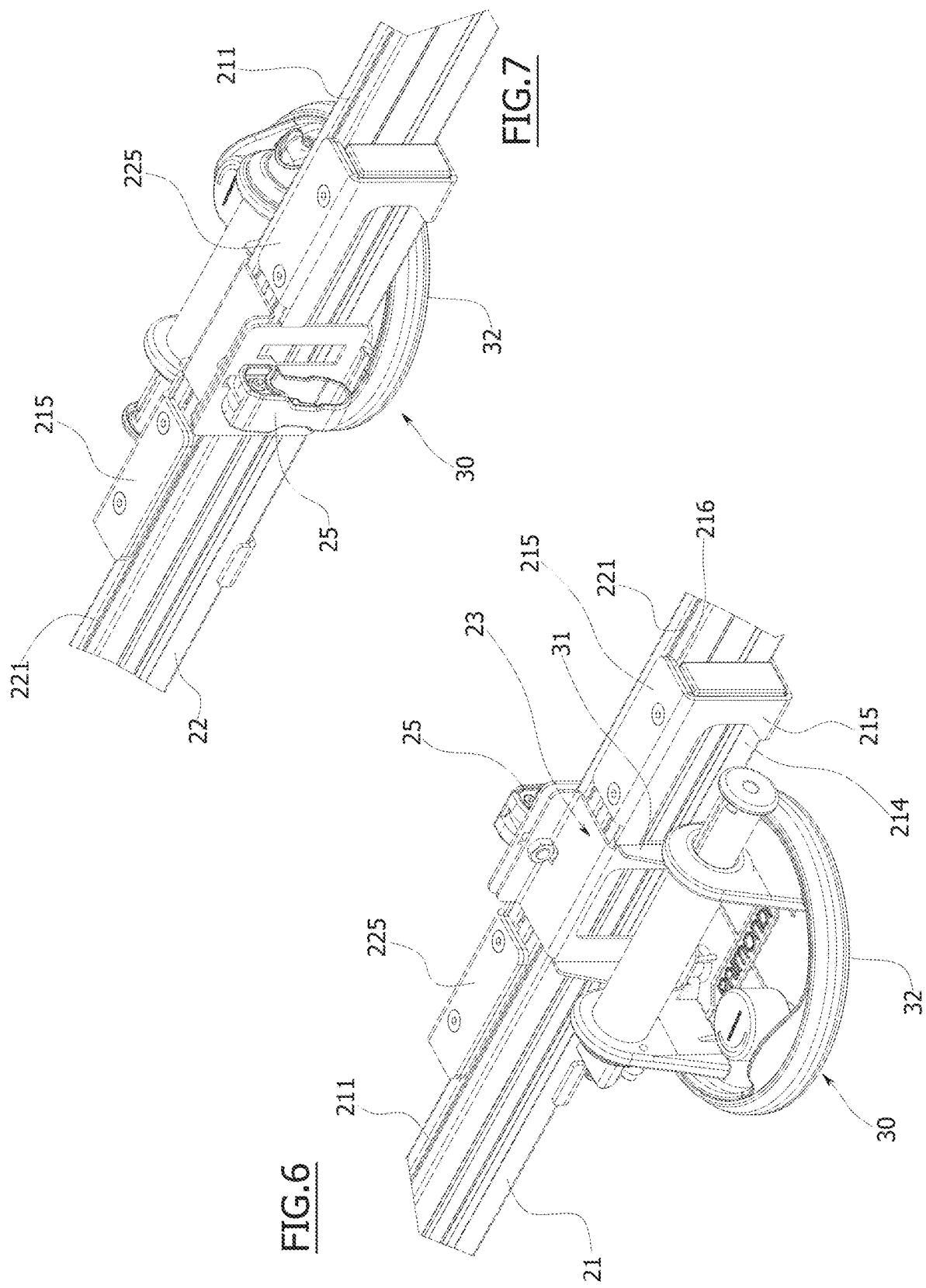

DEVICE FOR GRIPPING SLAB-SHAPED ELEMENTS

TECHNICAL FIELD

The present invention relates to a gripping device for large format sheet-shaped elements, such as tiles or glass sheets or the like.

In more detail, the invention relates to a gripping device that can be operated manually for gripping sheet-shaped elements.

PRIOR ART

As is known, the use on the market of large format sheet-shaped elements, such as 1-1.5×3-3.5 tiles and with reduced thicknesses, has been getting more common.

Such sheet-shaped elements are generally packaged in piles in cases provided with rigid lateral walls that surround the pile of sheet-shaped elements.

In order to be able to take a sheet-shaped element from the pile and proceed with the positioning and laying operations thereof, gripping devices are known, which have one or more rigid bars provided with a series of suction cups adapted to adhere to an upper surface of the sheet-shaped element (e.g. the visible surface of the tiles). Therefore, by lifting the rigid bar the operator lifts the sheet-shaped element and arranges it, for example, at the laying zone.

A strongly perceived need in these gripping devices is that of always making it possible to reach the surface of the sheet-shaped element with the suction cups, also of those arranged further down in the case; in practice, such gripping devices must adapt to the dimension of the case and be able to enter (vertically) inside it as the pile of sheet-shaped elements is reduced.

Likewise, to facilitate the maneuverability of the sheet-shaped element once it has been removed from the case, a further need is that of facilitating the grip and transport of the sheet-shaped element, i.e. making it easy and comfortable to grip the rigid bars, as well as having a weight that is as contained as possible so as not to weigh any further on the operator who is already burdened by the weight of the sheet-shaped element.

A further need of such devices is that of facilitating and improving the laying operations, especially when this is performed at the vertical walls allowing the transport and overturning operations (from horizontal to vertical and vice versa) of the sheet and also making them easier and safer in all gripping conditions thereof.

Again, a further technical requirement is that of being able to pick, transport and support effectively and safely in a stable grip, any format of sheets, whether they have a regular polygonal plan or any kind of irregular shape.

Another need is that of reducing to a minimum the dimensions of the gripping device when it is not being used so as to facilitate the storage and transport thereof and, at the same time, facilitate and speed up the preparation and/or dismantling of the gripping device, or parts thereof, minimising the duties for the personnel appointed to perform such operations who generally perform them various times, e.g. once for each sheet to be moved.

An object of the present invention is to solve such requirements and others of the prior art, with a simple, rational and low-cost solution.

Such purposes are accomplished by the characteristics of the invention given in the independent claim. The dependent claims outline preferred and/or particularly advantageous aspects of the invention.

DISCLOSURE OF THE INVENTION

The invention, in particular, makes available a device for gripping sheet-shaped elements that comprises:
- at least one longitudinal bar adjustable in length and provided with a plurality of suction gripping members connected along a longitudinal axis of the longitudinal bar.

Thanks to such solution, the invention makes available a gripping device that guarantees a stable grip of the sheet-shaped element by means of a plurality of suction gripping members arranged axially along the whole extension of the lateral bar, and also a gripping device that is adaptable to different formats of the sheet-shaped element, whether it has a regular or an irregular shape, by means of the lengthadjustable longitudinal bar.

Advantageously, according to an aspect of the invention, the gripping device may comprise:
- a pair of adjacent longitudinal bars, wherein each longitudinal bar is individually adjustable in length and is provided with a plurality of suction gripping members connected along a longitudinal axis of the longitudinal bar.

Thanks to such solution, the stable gripping effect of the sheet-shaped element by the gripping device is also more effective thanks to the combined use of the two longitudinal bars and the suction gripping members connected thereto.

Again, the gripping device can comprise:
- at least one longitudinal crossbar connected transversally to the pair of longitudinal bars.

Thanks to such solution, the structure of the gripping device is notably stronger and guarantees safer maneuverability, especially in the case of gripping and transporting large sheet-shaped elements, within the context of a particularly rational architecture and that is simple to implement.

According to an advantageous aspect of the invention, the crossbar can be rotatably connected to the pair of longitudinal bars.

Thanks to such solution, it has been made possible to obtain a gripping device that is more flexible in the positioning of the suction cups that support the sheet-shaped element, independently from the suction cups positioned in the longitudinal bars and independently between the crossbars. Such flexibility is particularly appreciated and useful when the perpendicularity between the crossbars and the longitudinal bars is not adapted to congruously support the sheet-shaped element, e.g. when it has unusual shapes or undercuts or holes that restrict the gripping possibility of the suction cups.

Furthermore, thanks to such solution it is possible to freely orient the crossbars with respect to the longitudinal bars, allowing greater manageability, ease and speed of installation of the gripping device for the appointed personnel, who do not need to check and make sure that the crossbars are perfectly squared with the longitudinal bars before installation, but can act more quickly on them.

Preferably, the crossbar can be connected to each longitudinal bar of the pair of longitudinal bars through a respective hinge joint.

Even more advantageously, each hinge joint can comprise an interconnection bracket fixed removably to the longitudinal bar and a support body fixed removably to the crossbar, wherein the support body is hinged to the interconnection bracket with the possibility to oscillate about a hinge axis perpendicular to the longitudinal axis of the longitudinal bar and a longitudinal axis of the crossbar.

According to a further aspect of the invention, the crossbar can comprise a main bar connected transversally to the pair of longitudinal bars and an extension bar also connected transversally to the pair of longitudinal bars parallel to the main bar and slidably coupled to the main bar itself between a closing position, in which its longitudinal dimension is totally contained within the longitudinal dimension of the main bar and an opening position in which it projects axially selectively from one or the other axial end of the main bar.

Thanks to such solution, it is possible to make available a further support for the gripping device, e.g. to facilitate the laying of the sheet-shaped elements and the overturning thereof onto the long side, and at the same time not increase the dimension of the gripping device when it is used to enter into the cases in which the sheet-shaped elements are contained.

According to an advantageous aspect, the extension bar can be slidably associated with the support body of each hinge joint.

Thanks to such solution, the activation in translation of the extension bar was made possible independently from the main bar and in a particularly functional way. Again, the extension bar can be placed alongside the main bar and slidably associated therewith.

According to a further aspect of the invention, the longitudinal bar can comprise a first side member and a second side member parallel and at least partially flanked to the first side member, wherein the first side member has, at an internal end thereof facing the second side member, a first retaining body configured to embrace at least partially an axial portion of the second side member and wherein the second side member has, at an internal end thereof facing the first side member, a second retaining body configured to embrace at least partially an axial portion of the first side member.

Thanks to such solution, it is possible to strengthen the connection between the side members, reducing the length of the guide sleeve (where provided), preventing the side members from opening in a scissor-like fashion or moving away from one another and, at the same time, improving the mutual sliding.

Furthermore, thanks to such solution, it is possible to reduce the total weight of the gripping device, allowing the weight burden on the operators appointed to move the sheet-shaped elements to be reduced.

Advantageously, the longitudinal bar can comprise a guide sleeve, wherein the first side-member and the second side-member are axially inserted inside the guide sleeve, being able to mutually slide in a longitudinal direction in order to adjust the length of the longitudinal bar.

Again, advantageously, at least a first sliding skid can be interposed between the first retaining body and the second side member and at least one second sliding skid can be interposed between the second retaining body and the first side member.

According to a further aspect of the invention, the suction gripping members can all be arranged on the same side of the longitudinal bar to which they are fixed (and, advantageously, also the handles that allow the lifting of the longitudinal bar are arranged on the same side of the respective longitudinal bar to which they are fixed and, even more preferably on the same side as the suction gripping members, aligned with their median plane parallel to the longitudinal axis of the longitudinal bar).

Thanks to this, it is possible to reduce the transverse dimension of each longitudinal bar, particularly when the gripping device is not being used.

Furthermore, thanks to this it is possible to reduce the angular moment insisting on the suction cups of the suction gripping members when the sheet-shaped element is raised and/or rotated for the overturning thereof, reducing torsional stress thereon and on the suction cups of the gripping members and the risk of accidental detachment of the sheet-shaped element from the suction cups themselves.

Furthermore, it is possible to envisage introducing teflon coating or other anti-friction expedients between all the members in mutual sliding motion, to facilitate the mutual motion thereof.

BRIEF DESCRIPTION OF THE DRAWINGS

Further features and advantages of the invention will be more apparent after reading the following description provided by way of a non-limiting example, with the aid of the figures shown in the accompanying drawings.

FIG. 4 is a lateral view of FIG. 3 inserted into a case for the gripping of a sheet-shaped element.

FIG. 5 is a plan view from above of FIG. 3.

FIG. 6 is an enlargement of detail VI of FIG. 3.

FIG. 7 is an enlargement of detail VII of FIG. 3.

BEST MODE OF THE INVENTION

Figure 1:
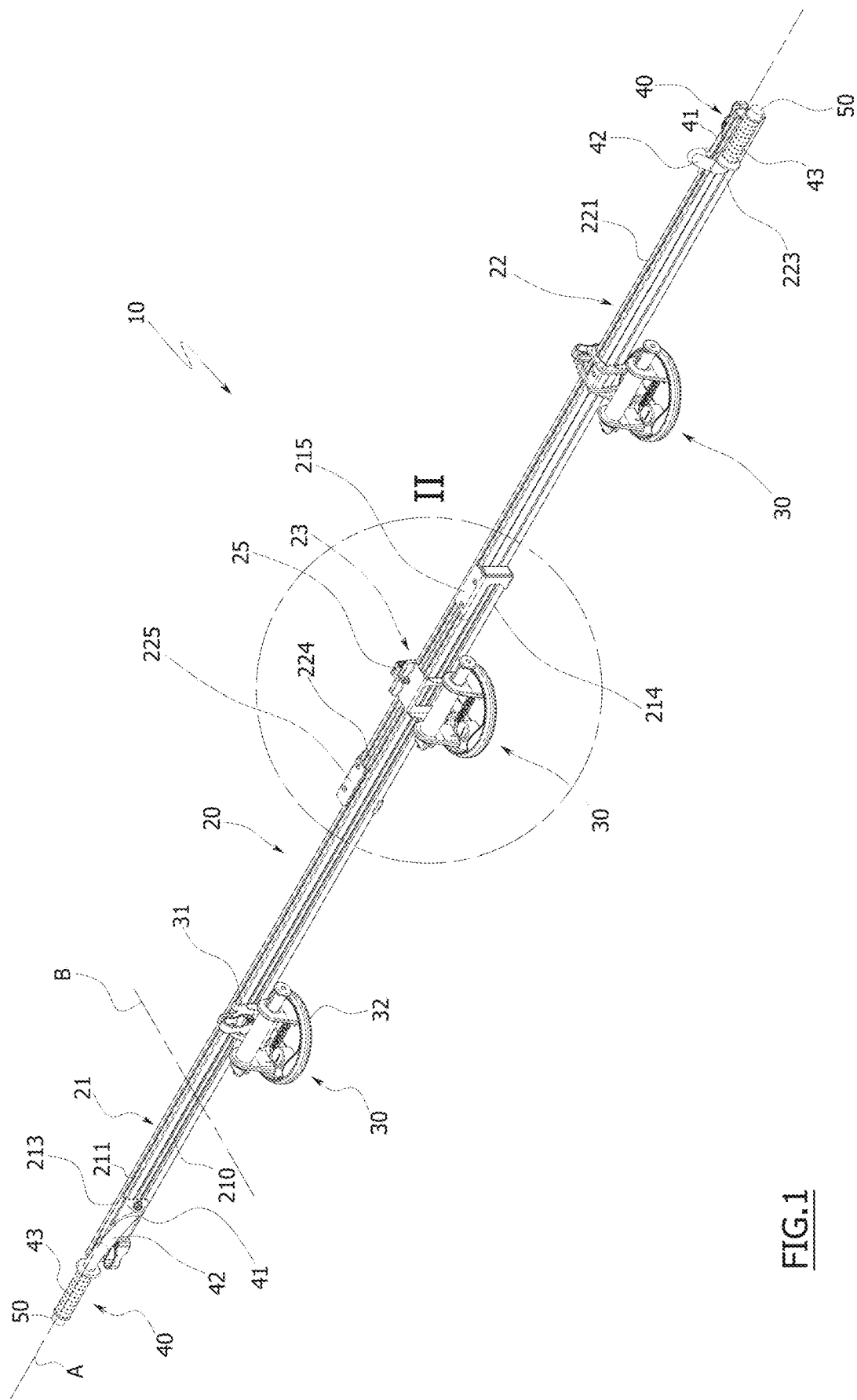
FIG. 1 is an axonometric view of an embodiment of a gripping device according to the invention.

With particular reference to such figures, 10 indicates overall a gripping device, e.g. for gripping sheet-shaped elements L, such as tiles or glass sheets or the like, of a large format, for example sheets with dimensions substantially comprised between 3-3.5 metres×1-1.5 metres.

The sheet-shaped elements L, as known, each have an upper (visible) surface and a lower (laying) surface.

For example, the sheet-shaped elements L are preferably arranged piled on top of one another by means of the respective lower (laying) surface in a case C provided with a closed bottom on which the pile of sheet-shaped elements L rests and lateral sides, e.g. rigid, that surround the entire pile of sheet-shaped elements L, and that also has an upper opening that frees the upper (visible) surface of the sheet-shaped elements themselves that are gradually found at the top of the pile.

The gripping device 10 comprises at least one longitudinal bar 20, which has a longitudinal axis A.

The longitudinal bar 20 is for example adjustable in length, as will be better described below.

The longitudinal bar 20 comprises a first side member 21 having a respective longitudinal axis and a second side member 22 having a respective longitudinal axis parallel to the longitudinal axis of the first side member 21.

The longitudinal axes of the first side member 21 and of the second side member 22 define overall the longitudinal axis A of the longitudinal bar 20.

The first side member 21 and the second side member 22 are adjacent to one another with respect to a flanking direction B perpendicular to their longitudinal axis (and parallel to the lying plane of the sheet-shaped element L—i.e. of the visible surface thereof—in use).

The first side member 21 and/or the second side member 22 are defined by longitudinal profiles, for example substantially rigid (not deformable by bending or torsion under the actual use work loads of the gripping device 10).

The first side member 21 has a substantially quadrangular section, e.g. rectangular, constant for the entire length.

Preferably, therefore, the first side member 21 has a pair of lateral walls (substantially parallel to one another), e.g. perpendicular in use to the visible surface of the sheet-shaped element L when gripped, and a pair of base walls (substantially parallel to one another) squared and adjacent to the lateral walls, which are in use parallel to the visible surface of the sheet-shaped element L when gripped. For example, the first side member 21 is obtained by extrusion of a metal material, e.g. a light alloy (such as aluminium for example), and is preferably hollow inside (i.e. it has an axial cavity for the entire extension although it can be provided with various reinforcement septa along the entire extension).

The first side member 21 has, at a first lateral wall thereof, a hollow 210, e.g. with a substantially dovetail or T-shaped cross section, along the entire longitudinal extension.

The hollow 210 is defined at a first longer lateral wall of the first side member 21. A second lateral wall opposite the first lateral wall having the hollow 210, for example, comprises longitudinal knurls, e.g. along the entire longitudinal extension, or could have shaped profiles along the entire longitudinal extension or a hollow along the entire longitudinal extension or be substantially smooth and/or planar.

Furthermore, the first side member 21 has, at a first lateral wall thereof, for example the upper one (or—in use—distal from the visible surface of the sheet-shaped element L when gripped), a further hollow 211, e.g. with a substantially dovetail or T-shaped cross section, along the entire longitudinal extension.

In detail, the further hollow 211 is defined at a first shorter base wall of the first side member 21.

A second base wall opposite the first base wall having the further hollow 211, for example, comprises longitudinal knurls, e.g. along the entire longitudinal extension, or could have shaped profiles along the entire longitudinal extension or a hollow along the entire longitudinal extension or be substantially smooth and/or planar (as shown in the example).

The first side member 21 for example comprises one or more caps each adapted to close an end 213,213 of the first side member 21, or of the axial cavity thereof. The first side member 21 has an external end 213, which defines an end portion of the longitudinal bar 20 as a whole, and an opposite internal end 214.

The first side member 21 comprises a first retaining body 215 adapted to project laterally from the first side member itself on the opposite side with respect to the first lateral wall having the hollow 210.

The first retaining body 215 is arranged at (or in proximity to) the (only) internal end 214 of the first side member 21.

In practice, the first retaining body 215 projects beyond the second lateral wall, opposite the first lateral wall having the hollow 210.

The first retaining body 215 of the first side member 21 is configured to embrace (slidably) at least partially an axial portion of the second side member 22, as will be better illustrated below.

Preferably, the first retaining body 215 has a first shelf (lower, or proximal to the sheet-shaped element L when gripped) and a second shelf (upper, or distal to the sheet-shaped element L when gripped) parallel to one another and each projecting laterally from the first side member 21 on the opposite side with respect to the first lateral wall having the hollow 210.

The distance between the first shelf and the second shelf is at least equal (or slightly greater) to the height of the first side member 21 (or to the distance between the base walls thereof).

The first shelf has a free end (distal from the second lateral wall, opposite the first lateral wall having the hollow 210) folded towards the second shelf (and, preferably, at a distance therefrom, although it is not excluded that it can be joined with the second shelf), which is for example substantially parallel to the second lateral wall of the first side member 21 (and is at a distance from the second lateral face of the first side member 21 at least equal to or slightly greater than the transverse width of each base wall of the first side member 21 itself).

In practice, the first shelf has an internal face in contact with the second lower base wall of the first side member 21 and that extends laterally therefrom, projecting transversally in the parallel direction to such base wall; the inner face of the first shelf, in fact, defines a lower support plane for an axial portion of the second side member 22.

The free folded end of the first shelf is instead configured to laterally embrace the axial portion of the second side member 22.

The second shelf has an inner face in contact with the first upper base wall of the first side member 21 and that projects laterally therefrom, projecting transversally in a parallel direction to such base wall and defining an upper support plane for an axial portion of the second side member 22 (parallel and at least partially facing the lower support plane defined by the first shelf).

The first shelf and the second shelf are, in the example, joined to one another by means of a joining wall, substantially squared with them which laterally faces the first side member 21, i.e. the first lateral wall thereof provided with the hollow 210. The first retaining body 215 has a decisively contained axial length, i.e. it has a substantially equal axial length to the width of the longitudinal bar 20 in the flanking direction of the first side member 21 with respect to the second side member 22, i.e. the axial length of the first retaining body 215 does not exceed twice said width of the longitudinal bar 20.

The first retaining body 215 has a (much) shorter length than the length of the first side member 21 and/or the second side member 22, e.g. equal to 5/100 of the length of the first side member 21 and/or of the second side member 22.

The first retaining body 215 is fixed, for example removably, to the first side member 21, e.g. by means of threaded members.

In the example, the first retaining body 215 is fixed to the first side member 21 through the further hollow 211 present in the upper base wall of the first side member 21 itself, e.g. by means of one or two clamping screws provided with nuts that engage the said further hollow 211.

Again, a first sliding skid 216 can be fixed to the first retaining body 215, e.g. to the second shelf thereof, in even more detail to the inner face thereof which projects transversally beyond the first side member 21 (or that faces the second shelf).

In practice, the first sliding skid 216 is adapted to be interposed between the first retaining body 215, e.g. the second shelf thereof, and the axial portion of the second side member 22 embraced by the first retaining body 215.

The first sliding skid 216 is for example fixed to the first retaining body 215 by interposition (in a vice arrangement) between the first shelf and the upper base wall of the first side member 21, still being able to project (substantially equally to the second shelf) from said upper base wall of the first side member 21.

The first sliding skid 216 is made of a material with a reduced sliding friction coefficient, i.e. having a lower sliding friction coefficient than the material of which the first retaining body 215 and/or the first side member 21 and/or the second side member 22 are made.

For example, the first sliding skid 216 is made of or coated in teflon.

The second side member 22 has a substantially quadrangular section, e.g. rectangular, constant for the entire length.

Preferably, therefore, the second side member 22 has a pair of lateral walls (substantially parallel to one another), e.g. perpendicular in use to the visible surface of the sheet-shaped element L when gripped, and a pair of base walls (substantially parallel to one another) squared and adjacent to the lateral walls, which are in use parallel to the visible surface of the sheet-shaped element L when gripped.

For example, the second side member 22 is obtained by extrusion of a metal material, e.g. a light alloy (such as aluminium for example), and is preferably hollow inside (i.e. it has an axial cavity for the entire extension although it can be provided with various reinforcement septa along the entire extension).

The second side member 22 has, at a first lateral wall thereof, a hollow 220, e.g. with a substantially dovetail or T-shaped cross section, along the entire longitudinal extension.

The hollow 220 is defined at a first longer lateral wall of the second side member 22.

A second lateral wall opposite the first lateral wall having the hollow 220, for example, comprises longitudinal knurls, e.g. along the entire longitudinal extension, or could have profiles shaped along the entire longitudinal extension or a hollow along the entire longitudinal extension or be substantially smooth and/or planar.

Furthermore, the second side member 22 has, at a first lateral wall thereof, for example the upper one (or—in use—distal from the visible surface of the sheet-shaped element L when gripped), a further hollow 221, e.g. with a substantially dovetail or T-shaped cross section, along the entire longitudinal extension. The further hollow 221 is defined at a first shorter base wall of the second side member 22.

A second base wall opposite the first base wall having the further hollow 221, for example, comprises longitudinal knurls, e.g. along the entire longitudinal extension, or could have profiles shaped along the entire longitudinal extension or a hollow along the entire longitudinal extension or be substantially smooth and/or planar (as shown in the example).

The second side member 22 for example comprises one or more caps each adapted to close an end 223,224 of the second side member 22, or of the axial cavity thereof.

The second side member 22 has an external end 223, which defines an end portion of the longitudinal bar 20 as a whole (opposite the end portion defined by the outer end 213 of the first side member 21), and an opposite internal end 224.

The second side member 22 comprises a second retaining body 225 adapted to project laterally from the second side member itself on the opposite side with respect to the first lateral wall having the hollow 220.

The second retaining body 225 is arranged at (or in proximity to) the (only) internal end 224 of the second side member 22.

In practice, the second retaining body 225 projects beyond the second lateral wall, opposite the first lateral wall having the hollow 220.

The second retaining body 225 of the second side member 22 is configured to embrace (slidably) at least partially an axial portion of the first side member 21, as will be better illustrated below.

Preferably, the second retaining body 225 has a first shelf (lower, or proximal to the sheet-shaped element L when gripped) and a second shelf (upper, or distal to the sheet-shaped element L when gripped) parallel to one another and each projecting laterally from the second side member 22 on the opposite side with respect to the first lateral wall having the hollow 220.

The distance between the first shelf and the second shelf is at least equal (or slightly greater) to the height of the second side member 22 (or to the distance between the lateral base walls thereof).

The first shelf has a free end (distal from the second lateral wall, opposite the first lateral wall having the hollow 220) folded towards the second shelf (and, preferably, at a distance therefrom, although it is not excluded that it can be joined with the second shelf), which is for example substantially parallel to the second lateral wall of the second side member 22 (and is at a distance from the second lateral face of the second side member 22 at least equal to or slightly greater than the transverse width of each base wall of the second side member 22 itself).

In practice, the first shelf has an internal face in contact with the lower base wall of the second side member 22 and that extends laterally therefrom, projecting transversally in the parallel direction to such base wall, defining a lower support plane for an axial portion of the first side member 21.

The free folded end of the first shelf is instead configured to laterally embrace the axial portion of the first side member 21.

The second shelf has an inner face in contact with the upper base wall of the second side member 22 and that projects laterally therefrom, projecting transversally in a parallel direction to such base wall and defining an upper support plane for an axial portion of the first side member 21 (parallel and at least partially facing the lower support plane defined by the first shelf).

The first shelf and the second shelf are, in the example, joined to one another by means of a joining wall, substantially squared with them which laterally faces the second side member 22, i.e. the first lateral wall thereof provided with the hollow 220.

The second retaining body 225 has a decisively contained axial length, i.e. it has a substantially equal axial length to the width of the longitudinal bar 20 in the flanking direction of the first side member 21 with respect to the second side member 22, i.e. the axial length of the second retaining body 225 does not exceed twice said width of the longitudinal bar 20.

The second retaining body 225 has a (much) shorter length than the length of the second side member 22 and/or the first side member 21, e.g. equal to 5/100 of the length of the first side member 21 and/or of the second side member 22.

The second retaining body 225 is fixed, for example removably, to the second side member 22, e.g. by means of threaded members.

In the example, the second retaining body 225 is fixed to the second side member 22 through the further hollow 221 present in the upper base wall of the second side member 22 itself, e.g. by means of one or two clamping screws provided with nuts that engage the said further hollow 221.

Again, a second sliding skid 226 can be fixed to the second retaining body 225, e.g. to the second shelf thereof, in even more detail to the inner face thereof which projects transversally beyond the second side member 22 (or that faces the second shelf).

In practice, the second sliding skid 226 is adapted to be interposed between the second retaining body 225, e.g. the second shelf thereof, and the axial portion of the first side member 21 embraced by the second retaining body 225.

The second sliding skid 226 is for example fixed to the first retaining body 225 by interposition (in a vice arrangement) between the first shelf and the upper base wall of the second side member 22, still being able to project (substantially equally to the second shelf) from said upper base wall of the second side member 22. The second sliding skid 226 is made of a material with a reduced sliding friction coefficient, i.e. having a lower sliding friction coefficient than the material of which the second retaining body 225 and/or the first side member 21 and/or the second side member 22 are made.

For example, the second sliding skid 226 is made of or coated in teflon.

The first retaining body 215 and second retaining body 225 are, in practice, the same as each other (and/or arranged symmetrically).

The first side member 21 and the second side member 22 have, for example, the same shape and size of cross section.

The first side member 21 and the second side member 22 have, for example, the same length.

The first side member 21 and the second side member 22 are, for example, exactly the same (identical) in terms of shape and size.

The first side member 21 and the second side member 22 are adjacent to one another (with respect to the flanking direction B) so that the second lateral walls opposite the first lateral walls having the hollows 210,220 are substantially in contact with one another (axial rubbing) or at a short distance from one another.

The hollows 210,220 are therefore opposing one another (i.e. open in opposite directions).

In practice, the first side member 21 and the second side member 22 slide on one another without any interconnection elements.

It is not excluded that between the first side member 21 and the second side member 22 a prismatic and/or sliding guide connection is defined.

In practice, the first side member 21 and the second side member 22 are symmetrical to one another with respect to a plane of symmetry that is perpendicular to the flanking direction B (i.e. perpendicular to the visible surface of the sheet-shaped element L when gripped).

In a preferred embodiment, the longitudinal bar 20 further comprises a guide sleeve 23 adapted to mutually constrain the first side member 21 and the second side member 22 allowing/assisting a mutual longitudinal translation, i.e. along the longitudinal axis A of the longitudinal bar 20.

The guide sleeve 23 may be of the open or closed cross section type, made of one piece or two or more pieces according to the construction requirements, as will be described in more detail below.

The guide sleeve 23 comprises a tubular body provided with an axial through cavity having a substantially parallel longitudinal axis (and coinciding) with the longitudinal axis A of the longitudinal bar 20 as a whole.

For example, the axial cavity (and/or the tubular body) has a substantially prismatic shape, e.g. with a quadrangular cross section, e.g. substantially square or rectangular.

The axial cavity has a cross section that is constant along the entire extension, configured (or having a shape and size such that) both the first side member 21 and the second side member 22 adjacent as described above, i.e. an intermediate section thereof interposed between the inner end 214 and 224 and the outer end 213 and 223 thereof, can be inserted therein, substantially to measure (simultaneously).

The axial length of the guide sleeve 23 is decisively contained, i.e. the axial length is substantially equal to the width of the longitudinal bar 20 in the flanking direction of the first side member 21 with respect to the second side member 22, i.e. the axial length of the second guide sleeve 23 does not exceed twice said width of the longitudinal bar 20.

The axial cavity and, therefore, the tubular body, of the guide sleeve 23 has a (much) shorter length than the length of the first side member 21 and/or the second side member 22, e.g. equal to 5/100 of the length of the first side member 21 and/or of the second side member 22.

Furthermore, the weight of the guide sleeve 23 is very contained, e.g. substantially less than or equal to the weight of the longitudinal bar 20, preferably less than the weight of one from among the first side member 21 and/or the second side member 22.

The tubular body of the guide sleeve 23 is for example a substantially rigid body (not deformable by—longitudinal—bending or torsion under the actual use work cycles of the gripping device 10).

The first side member 21 and the second side member 22 are both (simultaneously) inserted axially into the axial cavity of the guide sleeve 23 with the possibility to run through relative sliding along the longitudinal direction provided by the longitudinal axis of the axial cavity for the regulation of the length of the longitudinal bar 20.

For example, between the guide sleeve 23 and each of the first side member 21 and the second side member 22 a mechanical, prismatic type, connection is defined.

In practice, the first side member 21 is inserted into the axial cavity of the guide sleeve 23 so as to have both ends 213 and 214 projecting axially from the axial ends of the guide sleeve 23, likewise the second side member 22 is threaded into the axial cavity of the guide sleeve 23 so as to have both ends 223 and 224 projecting axially from the axial ends of the guide sleeve 23.

Each of the first side member 21 and the second side member 22 is individually axially slidable along the longitudinal axis of the guide sleeve 23 within the respective axial cavity portion of the guide sleeve 23 for the regulation of the total length of the longitudinal bar 20.

For example, each of the first side member 21 and the second side member 22 is slidable between two opposing end work positions and in infinite intermediate positions between them, wherein both remain inserted into the guide sleeve 23 and wherein, for example, in a first end position the inner end 214,224 (i.e. the respective retaining body 215,225) is near or at an end of the guide sleeve 23 and in a second end position the external end 213,223 is near or at the opposing end of the guide sleeve 23.

For example, the first retaining body 215 defines a mechanical end stop (abutment with the guide sleeve 23) for the axial sliding of the first side member 21 in its first end position and the second retaining body 225 defines a mechanical end stop (abutment with the guide sleeve 23) for the axial sliding of the second side member 22 in its first end position.

It is not excluded that one or both of the side members 21,22 may be extracted from the guide sleeve 23 as required.

The longitudinal bar 20, in particular, has a variable length (and adjustable as preferred) between a maximum elongation configuration, wherein its length is maximum, and a minimum elongation configuration, wherein is length is minimum. In the maximum elongation configuration both the first side member 21 and the second side member 22 are in a first end position, wherein each internal end 214,224 is near or at an end of the guide sleeve 23 and both are however inserted into the guide sleeve 23.

In the minimum elongation configuration both the first side member 21 and the second side member 22 are in an axially intermediate position between the first end position and the second end position, wherein for example each external end 213,223 is substantially equidistant from the respective internal end 214,224 (or however the first side member 21 and the second side member 22 are flanked/superposed with one another for most of their axial length).

The guide sleeve 23 can be made of a single body or by joining two or more separable bodies, as will be described in more detail below.

The guide sleeve 23 comprises a locking unit for the temporary and soluble locking of the relative longitudinal sliding of the first side member 21 and/or the second side member 22 along the longitudinal axis of the guide sleeve 23 itself.

For example, the passage gap of the axial cavity of the guide sleeve 23 is variable and can be activated between an enlarged configuration, in which it allows the mutual sliding of the first side member 21 and the guide sleeve 23 and/or the second side member 22 and the guide sleeve 23 and a restricted configuration, in which it prevents or contrasts the mutual sliding of the first side member 21 and the guide sleeve 23 and/or of the second side member 22 and the guide sleeve 23. The locking unit is for example rigidly connected to the guide sleeve 23.

The locking unit is for example a vice type locking unit, i.e. adapted to clamp as a package (in the transverse direction with respect to the longitudinal axis A of the longitudinal bar 20) mutually in a vice arrangement the guide sleeve 23, i.e. the tubular body thereof, with one or both of the side members 21,22.

The locking unit and the guide sleeve 20 can have various embodiments.

In the example illustrated, the guide sleeve 23, i.e. the tubular body, is made by joining two bodies coupled to one another.

For example, the guide sleeve 23 comprises a first shell, e.g. comprising an open C-shaped cross section, and a second shell, e.g. substantially plate shaped, adapted to close the open section of the first shell.

The first shell and the second shell have respective ears adapted to be mutually flanked for the fixing, through clamping members 25, e.g. threaded, of the first shell to the second shell.

In the example the first shell and the second shell each have an ear at each contact end between the shells.

For example, each ear of the first shell has at least one through hole adapted to be aligned with the through axis thereof at a through hole made in the respective ear of the second shell.

A clamping member 25 is inserted into the through holes.

In such first embodiment, the clamping member 25 comprises a threaded pin inserted into the through holes, axially locked, e.g. by means of a nut or by screwing, to one of the through holes, and provided with an activation member, e.g. a prismatic head and/or a cam lever associated with an end of the threaded pin distal from the through hole and to which the threaded pin is locked.

One of the two ears of each shell is constrained by means of clamping members 25 having a prismatic head (e.g. the lower ears), whereas the other of the ears of each shell is constrained by means of clamping members 25 having a cam lever. The clamping member 25 can be operated (manually) for the mutual release and clamping of the first shell and the second shell, so as to bring the axial cavity of the guide sleeve 23 respectively into its enlarged configuration, wherein it allows the axial sliding of the first side member 21 and of the second side member 22 inside it, and into its restricted position, wherein it prevents (by friction) or contrasts the sliding of the first side member 21 and of the second side member 22 inside it. In this configuration the locking unit is therefore defined by the same tubular body, which acts as a vice, whose jaws are the first shell and the second shell.

In general, the tubular body of the guide sleeve 23 can comprise holes or slits to make it lighter.

The gripping device 10 comprises at least one suction gripping member 30 connected to the longitudinal bar 20.

For example, the gripping device 10 comprises a plurality of suction gripping members 30 each connected to the longitudinal bar 20, e.g. arranged along the longitudinal axis A thereof and separate from one another.

Each suction gripping member 30 comprises a support frame 31 that can be anchored to the longitudinal bar 20 and at least one suction cup 32 fixed to the support frame 31.

For example, to improve the lifting operations of the sheet-shaped element L especially when it is heavy and/or flexible—it is possible to provide for the suction cup 32 to be associated in an oscillating way (with contained oscillation) with respect to the longitudinal bar 20, e.g. with respect to an oscillation axis parallel to the longitudinal axis A of the longitudinal bar 20 or with respect to an oscillation axis perpendicular to the longitudinal axis A (e.g. parallel to the flanking direction B) or a combination of oscillations.

In this way, the suction cup 32 can follow the different orientations or folds or curves of the sheet-shaped element L remaining with its gripping surface always parallel to the gripping surface of the sheet-shaped element L.

For example, the suction cup 32 can be associated in an oscillating (tilting) way with respect to the support frame 31, which is rigidly connected to the longitudinal bar 20; it is not excluded that it may be on the contrary the support frame 31 associated in an oscillating way with the longitudinal bar and the suction cup 32 fixed rigidly to the support frame 31.

For example the suction cup 32 can be variously configured in the oscillating or fixed configuration with respect to the longitudinal bar 20 by the damping of oscillation locking means, e.g. soluble, such as threaded members.

Each suction gripping member 30 can comprise one (as illustrated) or more suction cups in groups.

Each suction gripping member 30 can be for example provided with a vacuum pump and a vacuum gauge.

Each suction gripping member 30 can be fixed to the longitudinal bar 20 in any axial position thereof as will appear more clearly below.

For example, a first suction gripping member 30 is connected to the first side member 21, e.g. in (any) axial position interposed between the internal end 214 and the external end 213, e.g. closer to the external end 213 than to the internal end 214. For example, a second suction gripping member 30 is connected to the second side member 22, e.g. in (any) axial position interposed between the internal end 224 and the external end 223, e.g. closer to the external end 223 than to the internal end 224.

For example, the support frame 31 of the (first and second) suction gripping member 30 comprises a fixing bracket adapted to removably fix the support frame 31 to one from among the first side member 21 and the second side member 22 e.g. at the first lateral wall thereof provided with the respective hollow 210,220.

According to an advantageous aspect of the present invention, the suction gripping members 30, in particular, the first suction gripping member 30 and the second suction gripping member 30, are arranged on the same side as the longitudinal bar 20 to which they are fixed.

In other words, the suction gripping members 30 fixed to the side members 21,22 that define the longitudinal bar 20 are arranged (prevalently or totally) to the side and on the same side with respect to a longitudinal median plane passing through the longitudinal axis A of the longitudinal bar 20 perpendicular to the flanking direction B thereof (i.e. perpendicular to the visible surface of the sheet-shaped element L being gripped).

In more detail the suction gripping members 30, i.e. the median planes of the respective suction cup 32 parallel to the aforesaid longitudinal median plane of the longitudinal bar 20, are both arranged to the right or left of the longitudinal bar 20. In practice, one of the suction gripping members 30 is placed near to the first lateral wall provided with the hollow 210,220 of the respective side member 21,22 and distal from the opposite second lateral wall, the other suction gripping member 30 is, instead placed near to the second lateral wall of the respective side member 21,22 and distal from the first lateral wall provided with the hollow 210,220.

In the example illustrated, the first suction gripping member 30 is placed near to the first lateral wall provided with the hollow 210 of the respective side member 21 and distal from the opposite second lateral wall, whereas the second suction gripping member 30 is placed near to the second lateral wall of the respective side member 22 and distal from the first lateral wall provided with the hollow 220.

To do this, the support frame 31 of the suction gripping members 30, i.e. of the first suction gripping member 30 and of the second suction gripping member 30 are different from one another as will appear more clearly below.

In particular, the support frame 31 that supports the suction gripping member 30 near to the lateral wall provided with the hollow 210,220 of the respective side member 21,22, in the example the first suction gripping member 30 fixed to the first side member 21, comprises a first fixing bracket (of a first type).

The first fixing bracket of the support frame 31 comprises a first C-shaped plate, with concavity turned towards the respective side member 21,22 (i.e. the first side member 21), in particular towards the first lateral wall thereof, which is adapted to embrace at least partially the respective side member 21,22 e.g. at the first lateral wall provided with the hollow 210,220 and with the adjacent upper and lower base walls.

A shaped pin (or nut) is fixed to the first shaped plate by means of a threaded member.

The shaped pin is inserted (by means of a prismatic connection) into the hollow 210,22, in particular the first hollow 210, with the possibility to slide along the longitudinal axis thereof without being able to be extracted transversally and the threaded member projects transversally from the hollow 210,220 and is connected to the first shaped plate.

The first fixing bracket of the support frame 31 is adapted to be locked (in a temporary and adjustable way) axially along the longitudinal axis of the respective side member 21,22 i.e. of the first side member 21, by means of clamping of the threaded member, which is provided with a clamping lever, in the example a cam lever.

A lower support plate is fixed to the first fixing bracket of the support frame 31 (substantially squared with the first lateral wall provided with the hollow 210,220) which supports the suction cup 32, so that it projects below a plane defined by the lower base wall (turned towards the sheet-shaped element L during use) of the respective side member 21,22.

Instead, the support frame 31 that supports the suction gripping member 30 near to the second lateral wall (i.e. the one not provided with the hollow 210,220) of the respective side member 21,22 in the example the second suction gripping member 30 fixed to the second side member 22, comprises a second fixing bracket (of a second type).

The second fixing bracket of the support frame 31 comprises a first C-shaped plate, with concavity turned towards the respective side member 21,22 (i.e. the second side member 22), in particular towards the first lateral wall thereof, which is adapted to embrace at least partially the respective side member 21,22 e.g. at the first lateral wall provided with the hollow 210,220 and with the adjacent upper and lower base walls.

A shaped pin (or nut) is fixed to the second shaped plate by means of a threaded member.

The shaped pin is inserted (by means of a prismatic connection) into the hollow 210,22, in particular the second hollow 220, with the possibility to slide along the longitudinal axis thereof without being able to be extracted transversally and the threaded member projects transversally from the hollow 210,220 and is connected to the second shaped plate.

The second fixing bracket of the support frame 31 is adapted to be locked (in a temporary and adjustable way) axially along the longitudinal axis of the respective side member 21,22 i.e. of the second side member 22, by means of clamping of the threaded member, which is provided with a clamping lever, in the example a cam lever.

A second support plate with an upper bolt is fixed to the second fixing bracket of the support frame 31, which is adapted to surmount the upper base wall of the respective side member 21,22 in the example of the second side member 22.

In particular, such bolted support plate comprises a first layer parallel to (and resting on) the upper base wall of the respective side member 21,22 and a second layer parallel to the lateral walls of the respective side member 21,22, in particular parallel to and at a distance from the second lateral wall (not provided with the hollow 210,220).

In more detail, the second layer is placed at a distance from the second lateral wall (not provided with the hollow 210,220) of the respective side member 21,22, i.e. of the second side member 22, by a distance at least equal (or slightly greater than) the width of the other side member 21,22, i.e. of the first side member 21 (i.e. the width of the base walls thereof).

In substance, the bolted support plate fixed to one of the side members 21,22, in the example the second side member 22, is conformed so as to define a passage channel within which the other side member 21,22 is adapted to slide axially, in the example the first side member 21, when the two side members 21 slide mutually due to the variation in length of the longitudinal bar 20.

The lower free end of the (second layer of the) bolted support plate supports the suction cup 32, so that it projects below a plane defined by the lower base wall (turned towards the sheet-shaped element L during operation) of the respective side member 21, 22.

The suction cups 32 of each suction gripping unit 30 are aligned along an alignment direction parallel to the longitudinal axis of the longitudinal bar 20, i.e. the median planes of the suction cups 32 parallel to the aforesaid longitudinal median plane of the longitudinal bar 20 coincide.

Furthermore, the distance between the (lower) gripping surface of the suction cup 32 and the lower base wall of the respective side member 21,22 is minimum, e.g. it is substantially comprised between 10 mm and 60 mm.

It is not excluded that more than one suction gripping unit 30 can be fixed to the respective side member 21,22 e.g. as described above.

Furthermore, it is not excluded that the suction gripping units can be mounted so as not to be aligned and all on the same side of the longitudinal bar 20, if the requirements are as such.

Furthermore, a third suction gripping member 30 can be connected to the guide sleeve 23.

For example, the third suction gripping member 30 is rigidly connected to the guide sleeve 23 (i.e. it is fixed integrally thereto or removably according to requirements). In particular, the support frame 31 of the third suction gripping member 30 is fixed directly, e.g. through welding, to the tubular body of the guide sleeve 23, e.g. at an outer lateral wall thereof parallel to the first lateral wall of one of the two side members 21,22 provided with the respective hollow 210,220.

The support frame 31 is provided with a support plate (substantially squared with the lateral wall of the tubular body with which the support frame 31 is associated) which supports the suction cup 32, so that it projects below a plane defined by the lower wall (turned towards the L-shaped sheet element during operation) of the tubular body of the guide sleeve 23.

Also such third suction gripper 30 can be arranged (prevalently or totally) on the same side as the longitudinal bar 20 in which the other (first and second) suction gripping members 30 are arranged, preferably aligned therewith, i.e. having the median plane (parallel to the aforesaid longitudinal median plane of the longitudinal bar 20) of the respective suction cup 32 substantially coinciding with the median planes (parallel to the aforesaid longitudinal median plane of the longitudinal bar 20) of the suction cups 32 of the other (first and second) suction gripper members 30.

The suction cups 32 of each suction gripper member 30 (first, second and third) are then substantially coplanar, i.e. they have lower gripping surfaces that are coplanar to one another and lying on a (single) plane parallel to the longitudinal axis A of the longitudinal bar 20, so as to be able to all adhere to the (same) visible surface of a sheet-shaped element L.

In the case in which the suction cups 32 of each suction gripping member 30 (first, second and third) are associated in an oscillating/tilting way with the longitudinal bar 20, as described above, they are coplanar when the surface of the sheet-shaped element L is planar or when they are free; in the event that they adhere to a structured/undulated surface the suction cups 32 all pertain to such surface.

The gripping device 10 comprises a handle 40 which is connected to the longitudinal bar 20.

Preferably, the gripping device 10 comprises a pair of handles 40 each connected to the longitudinal bar 20, e.g. separated along the longitudinal axis A thereof and arranged near to the opposite ends of the longitudinal bar A.

Each handle 40 can be fixed to the longitudinal bar 20 in any axial position thereof as will appear more clearer below.

For example, a first handle 40 is connected to the first side member 21, e.g. in (any) axial position thereof interposed between the internal end 214 and the external end 213, e.g. near to or at the external end 213 thereof.

For example, a second handle 40 is connected to the second side member 22, e.g. in (any) axial position thereof interposed between the internal end 224 and the external end 223, e.g. close to or at the external end 223 thereof.

According to an advantageous aspect of the present invention, the handles, in particular, the first handle 40 and the second handle 40, are arranged on the same side of the longitudinal bar 20 to which they are fixed.

In other words, the handles 40 fixed to the side members 21,22 that define the longitudinal bar 20 are arranged (prevalently or totally) to the side and on the same side with respect to a longitudinal median plane passing through the longitudinal axis A of the longitudinal bar 20 perpendicular to the flanking direction B thereof (i.e. perpendicular to the visible surface of the sheet-shaped element L being gripped).

In more detail, the handles 40 i.e. at least the grasping portions thereof, are both arranged to the right or left of the longitudinal bar 20.

In practice, one of the handles 40 is placed near to the first lateral wall provided with the hollow 210,220 of the respective side member 21,22 and distal from the opposite second lateral wall, the other handle 40 is, instead placed near to the second lateral wall of the respective side member 21,22 and distal from the first lateral wall provided with the hollow 210,220.

In the example illustrated, the first handle 40 is placed near to the first lateral wall provided with the hollow 210 of the respective side member 21 and distal from the opposite second lateral wall, whereas the second handle 40 is placed near to the second lateral wall of the respective side member 22 and distal from the first lateral wall provided with the hollow 220.

Each handle 40 has an anchoring bracket 41 adapted to removably fix the handle 40 to one from among the first side member 21 and the second side member 22 e.g. at the first lateral wall thereof provided with the respective hollow 210,220. To do this, the anchoring brackets 41 of the handles 40, i.e. of the first handle 40 and of the second handle 40, are different from one another as will appear more clearly below.

In particular, a first anchoring bracket 41 (of a first type) supports the handle 40 near to the first lateral wall provided with the hollow 210,220 of the respective side member 21,22, in the example the first handle 40 fixed to the first side member 21. The first anchoring bracket 41 comprises a C-shaped plate, with concavity turned towards the respective side member 21,22 in particular of the first side member 21, i.e. towards the first lateral wall provided with the hollow 210,220, and is adapted to embrace at least partially the respective side member 21,22 e.g. at the first lateral wall provided with the hollow 210,220 and with the adjacent upper and lower base walls.

A shaped pin (or nut) is fixed to the shaped plate of the anchoring bracket 41 by means of a threaded member.

The shaped pin is inserted (by means of a prismatic connection) within the hollow 210,22, with the possibility to slide along the longitudinal axis thereof without being able to be extracted transversally and the threaded member projects transversally from the hollow 210,220 and is connected to the shaped plate.

The first anchoring bracket 41 is adapted to be locked (in a temporary and adjustable way) axially along the longitudinal axis of the respective side member 21,22 by means of clamping of the threaded member, which is provided with a clamping lever, in the example, of the cam type.

The first anchoring bracket 41 then comprises a first bridge 42 provided with an end whose free end is rigidly connected (e.g. welded) to the C-shaped plate and an opposing free end.

The free end and an axial (substantially cylindrical) section proximal to such free end of the first bridge 42 defines a first grip 43 that can be grasped by a hand of an operator.

Such first hand grip 43 has a longitudinal axis substantially parallel to the longitudinal axis of the respective side member 21,22 i.e. of the first side-member 21 to which it is fixed.

In particular, a second anchoring bracket 41 (of a second type) supports the handle 40 near to the second lateral wall (not provided with the hollow 210,220) of the respective side member 21,22, in the example the second handle 40 fixed to the second side member 22.

The second anchoring bracket 41 comprises a C-shaped plate, with concavity turned towards the respective side member 21,22 in particular to the second side member 22, i.e. towards the first lateral wall provided with the hollow 210,220 thereof, and is adapted to embrace at least partially the respective side member 21,22 e.g. at the first lateral wall provided with the hollow 210,220 and with the adjacent upper and lower base walls.

A shaped pin (or nut) is fixed to the second anchoring bracket 41 by means of a threaded member.

The shaped pin is inserted (by means of a prismatic connection) within the hollow 210,22, with the possibility to slide along the longitudinal axis thereof without being able to be extracted transversally and the threaded member projects transversally from the hollow 210,220 and is connected to the shaped plate.

The second anchoring bracket 41 is adapted to be locked (in a temporary and adjustable way) axially along the longitudinal axis of the respective side member 21,22 by means of clamping of the threaded member, which is provided with a clamping lever, in the example, of the cam type.

The second anchoring bracket 41 then comprises a second bridge 42 (different from the first bridge 42) provided with an end whose free end is rigidly connected (e.g. welded) to the C-shaped plate and an opposing free end.

The second bridge 42 is configured so as to surmount (at a distance) the upper base wall of the respective side member 21,22, in the example of the second side member 22.

The free end and an axial (substantially cylindrical) section proximal to such free end of the second bridge 42 defines a second grip 43 that can be grasped by a hand of an operator.

Such second hand grip 43 has a longitudinal axis substantially parallel to the longitudinal axis of the respective side member 21,22 i.e. of the second side-member 22 to which it is fixed.

Preferably, such second hand grip 43 is arranged on the same side (to the side) of the first hand grip 43 with respect to the longitudinal bar A, more preferably the first hand grip 43 and the second hand grip 43 are coaxial to one another.

Again, in the example, both the handles 40 of the same longitudinal bar 20 (i.e. the hand grips 43 thereof) are arranged on the same side as the longitudinal bar 20 in which (all) the suction gripper units 30 are arranged (i.e. the respective suction cups 32 thereof).

In more detail, the axes of the hand grips 43 of both the handles 40 lie on a plane coinciding with the median (common) planes of the suction cups 32 parallel to the aforesaid longitudinal median plane of the longitudinal bar 20.

Then, according to an advantageous aspect, the first handle 40 defines a mechanical end stop (abutment with the guide sleeve 23) for the axial sliding of the first side member 21 in its second end position and the second handle 40 defines a mechanical end stop (abutment with the guide sleeve 23) for the axial sliding of the second side member 22 in its first end position.

The gripping device 10 comprises a foot 50 which is connected to the longitudinal bar 20, e.g. at an axial end thereof.

The foot 50 is adapted to facilitate the overturning operations of the sheet-shaped element L, e.g. on the shorter side thereof.

The gripping device 10 comprises, in the example, a pair of feet 50 each connected to the longitudinal bar 20, e.g. one for each of the opposite ends of the longitudinal bar A.

Each foot 50 can be anchored to the longitudinal bar 20 as will appear more clearly below.

Each foot 50 is connected slidably to the longitudinal bar 20 and so that its position can be regulated along the longitudinal axis A of the longitudinal bar 20 between a retracted position, in which it is at least partially contained within the longitudinal dimensions of the longitudinal bar 20 (or it is at least substantially near to an end of the longitudinal bar to which it is constrained), and an extracted position, in which the longitudinal bar 20 extends axially on one side and projects longitudinally therefrom.

For example, each foot comprises at least one soft end portion, e.g. rubber.

A first foot 50 is connected to the first side member 21, e.g. near to or at the outer end 213 thereof.

A second foot 50 is connected to the second side member 22, e.g. near to or at the outer end 223 thereof.

Each foot 50 comprises a locking means adapted to lock the axial sliding of the foot 50 in the retracted position, in the extracted position and in any axial position interposed between the retracted position and the extracted position.

For example, each foot 50 can have an anchoring bracket adapted to removably fix the foot 50 to one from among the first side member 21 and the second side member 22 e.g. at the first lateral wall thereof provided with the respective hollow 210,220.

The anchoring bracket 41 can comprise a C-shaped plate, with concavity turned towards the side member 21,22 adapted to embrace at least partially the respective side member 21,22 e.g. at the first lateral wall provided with the hollow 210,220 and with the adjacent upper and lower walls.

A shaped pin (or nut) can be fixed to the shaped plate of the anchoring bracket by means of a threaded member.

The shaped pin is inserted (by means of a prismatic connection) into the hollow 210,22, with the possibility to slide along the longitudinal axis thereof without being able to be extracted transversally and the threaded member projects transversally from the hollow 210,220 and is connected to the shaped plate.

The anchoring bracket is adapted to be locked (in a temporary and adjustable way) axially along the longitudinal axis of the respective side member 21,22 by means of clamping of the threaded member, which is provided with a clamping knob or lever.

In the example, the foot 50 is fixed integrally to the handle 40 i.e. it is integral therewith, e.g. at the free end distal from the guide sleeve 30 thereof, so as to axially extend the handle itself, i.e. the hand grip 43 thereof.

In practice, the fixing bracket of the foot 50 is the same fixing bracket 41 of the respective handle 40.

In the example, a foot 50 is fixed to each handle 40, e.g. at the free end of the respective hand grip 43.

Figure 2:
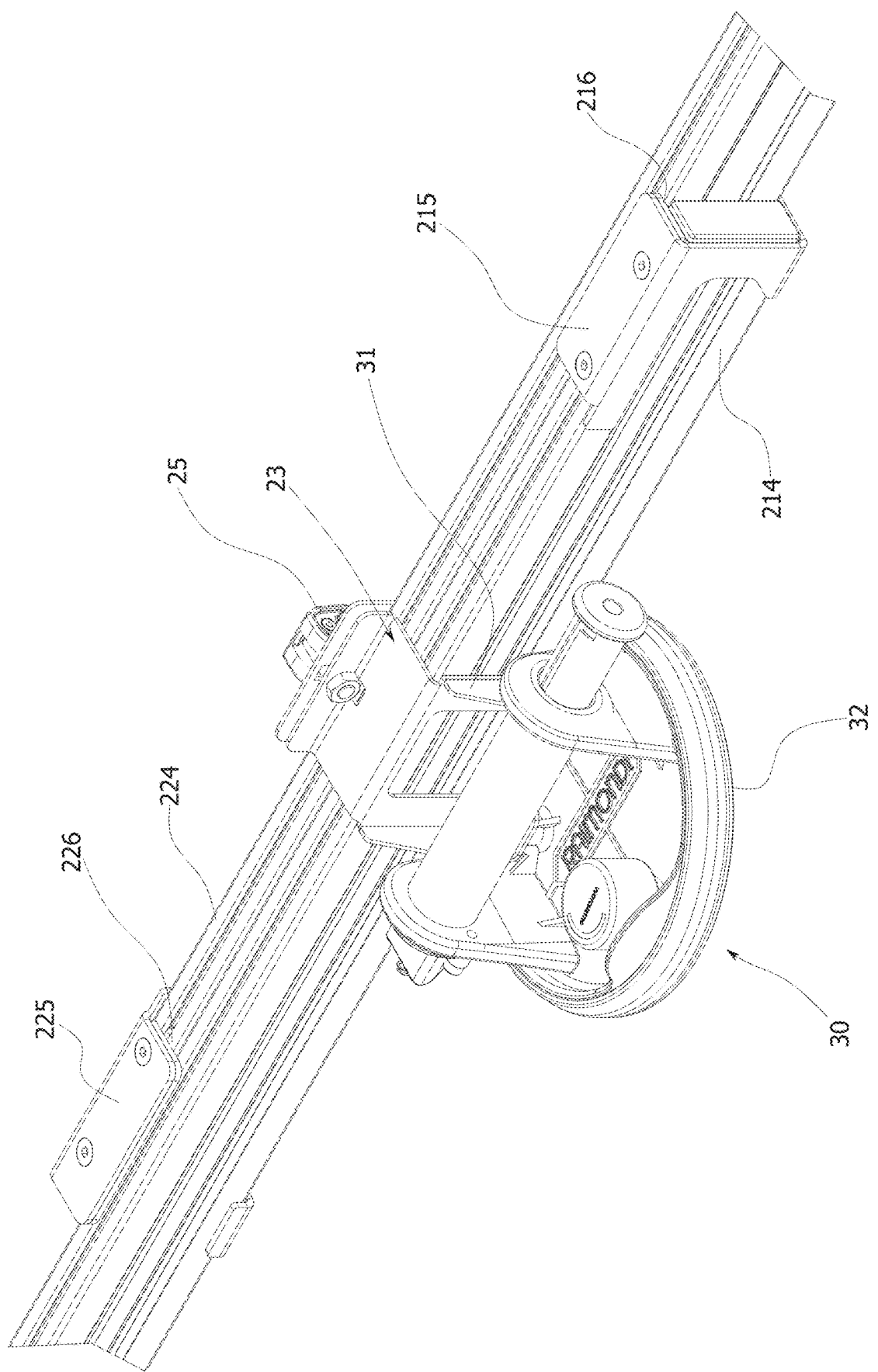
FIG. 2 is an enlargement of detail II of FIG. 1.
Figure 3:
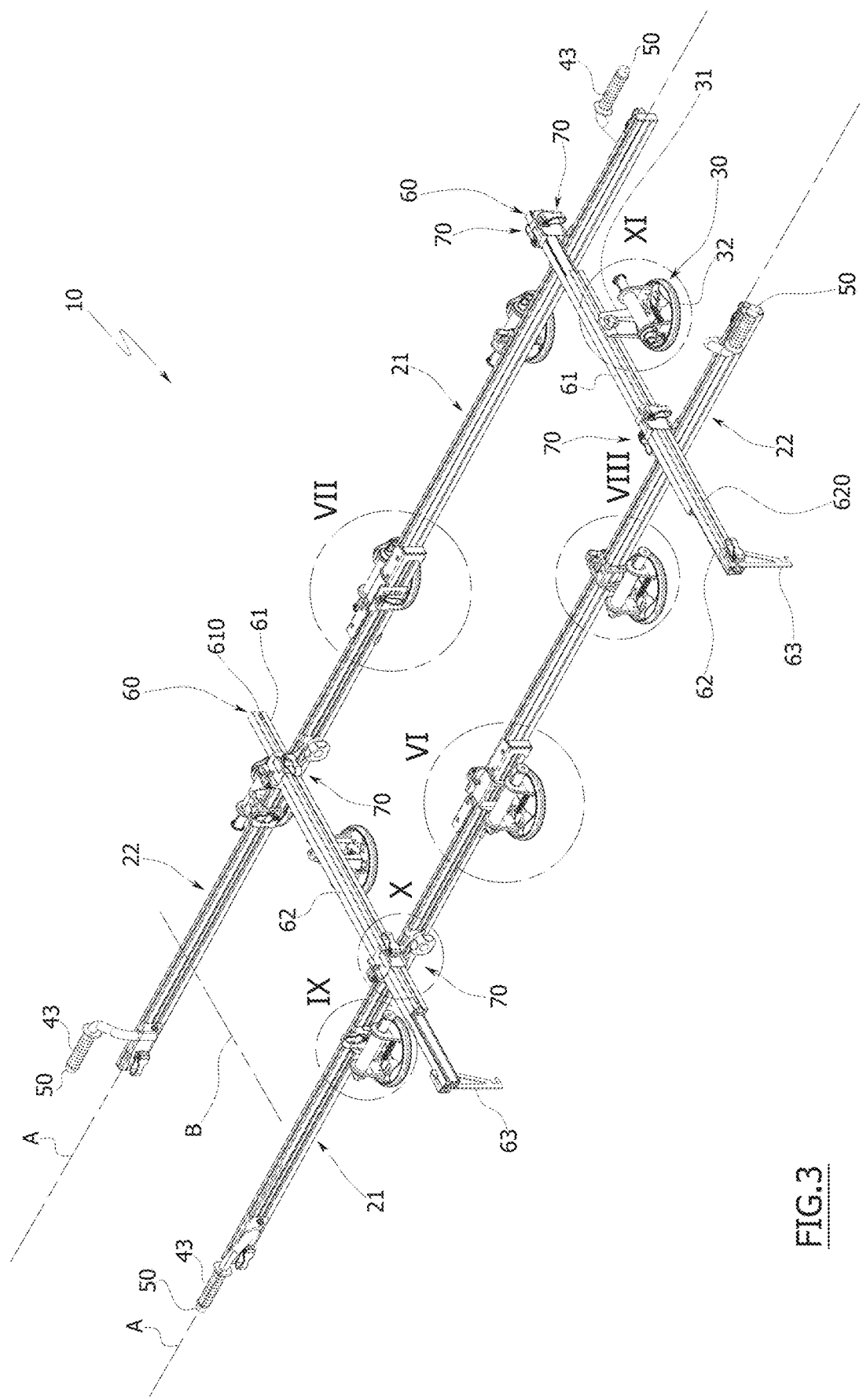
FIG. 3 is an axonometric view of a further embodiment of a gripping device according to the present invention.
Figure 12:
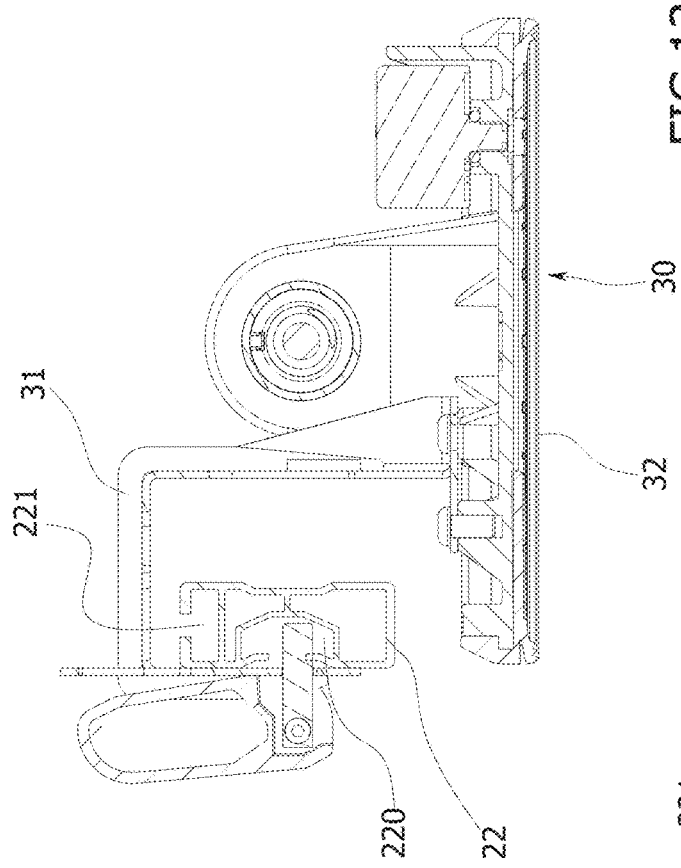
FIG. 12 is a sectional view along the trace of section XII-XII of FIG. 5.
Figure 8:
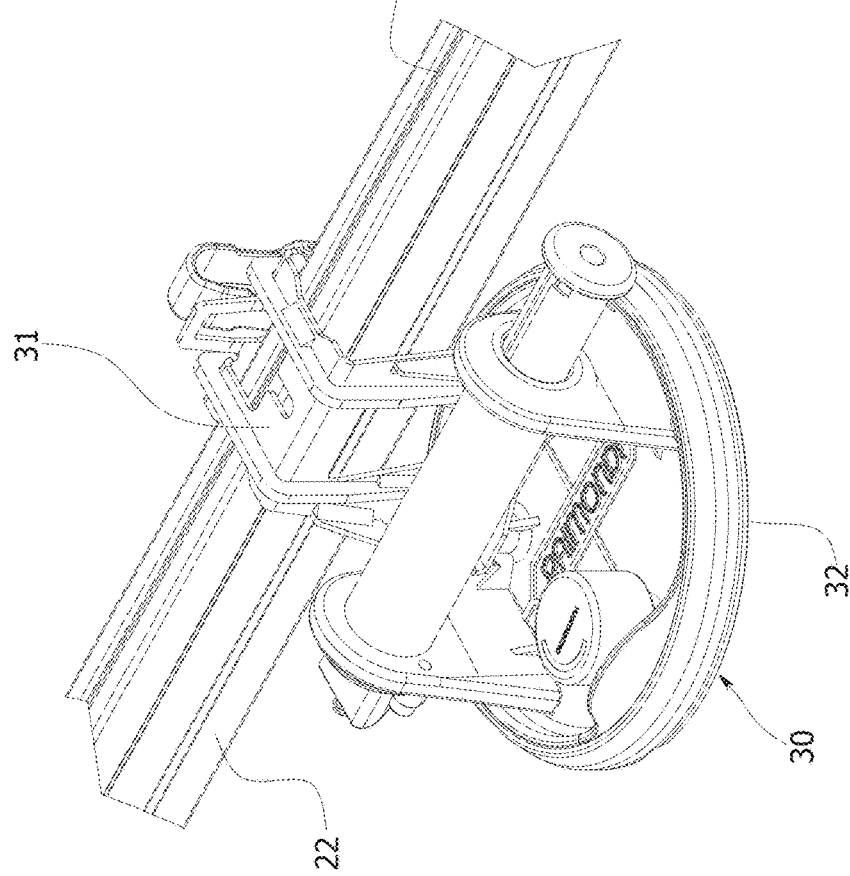
FIG. 8 is an enlargement of detail VIII of FIG. 3.
Figure 13:
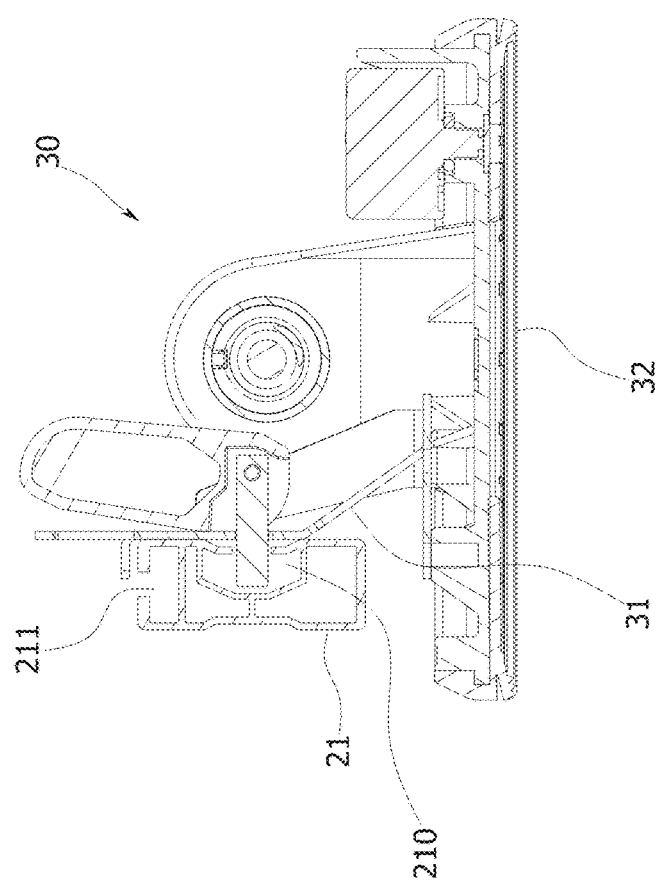
FIG. 13 is a sectional view along the trace of section XIII-XIII of FIG. 5.
Figure 9:
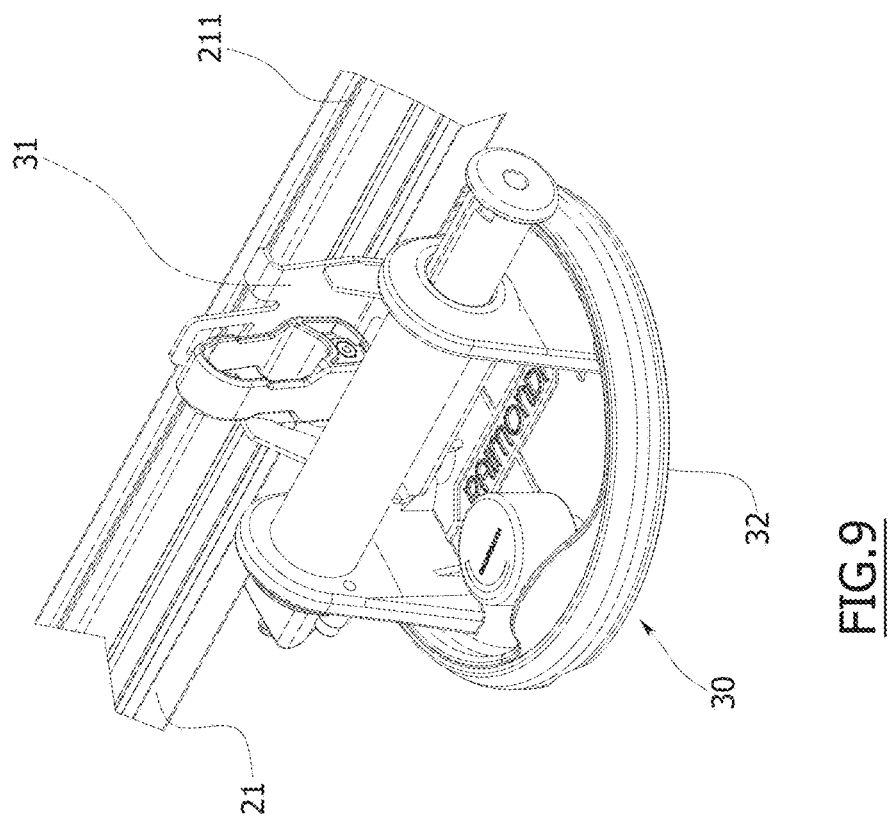
FIG. 9 is an enlargement of detail IX of FIG. 3.
Figure 15:
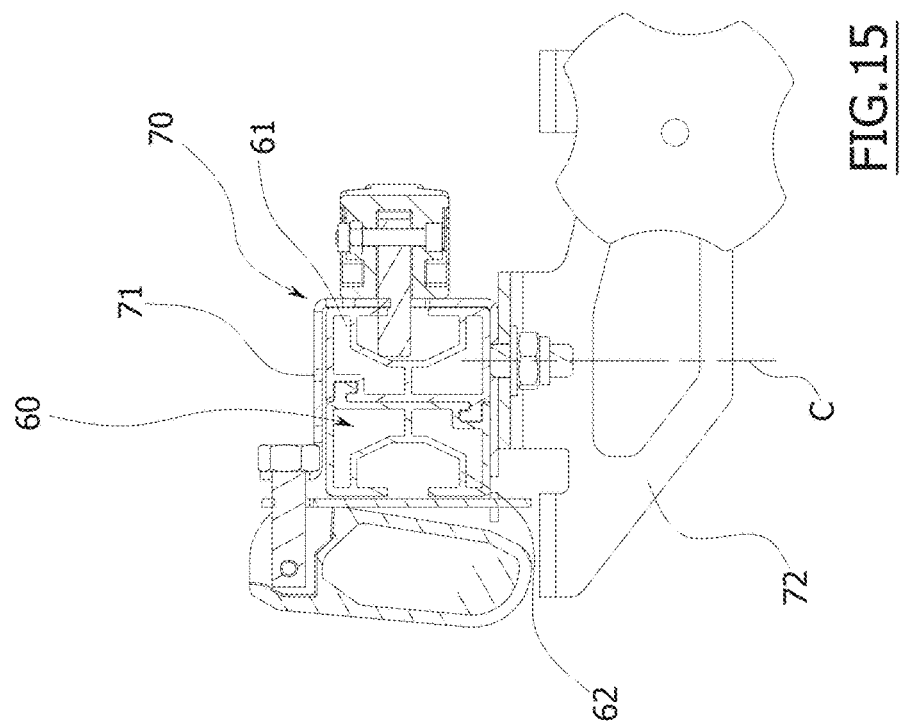
FIG. 15 is a sectional view along the trace of section XV-XV of FIG. 5.
Figure 10:
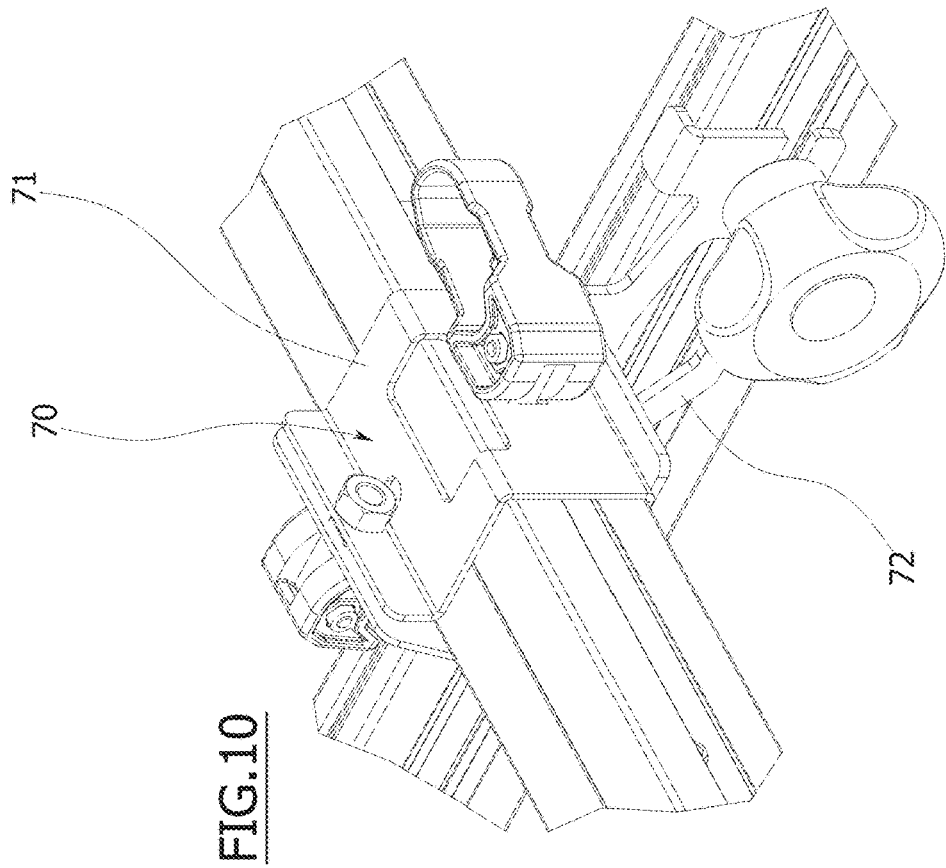
FIG. 10 is an enlargement of detail X of FIG. 3.
Figure 14:
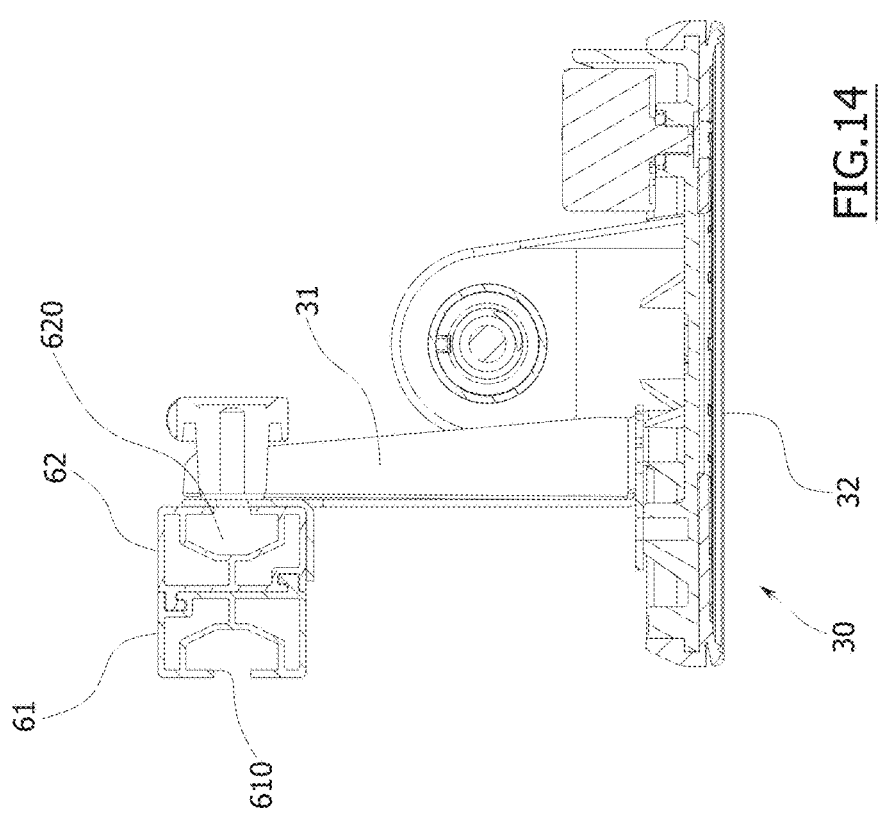
FIG. 14 is a sectional view along the trace of section XIV-XIV of FIG. 5.
Figure 11:
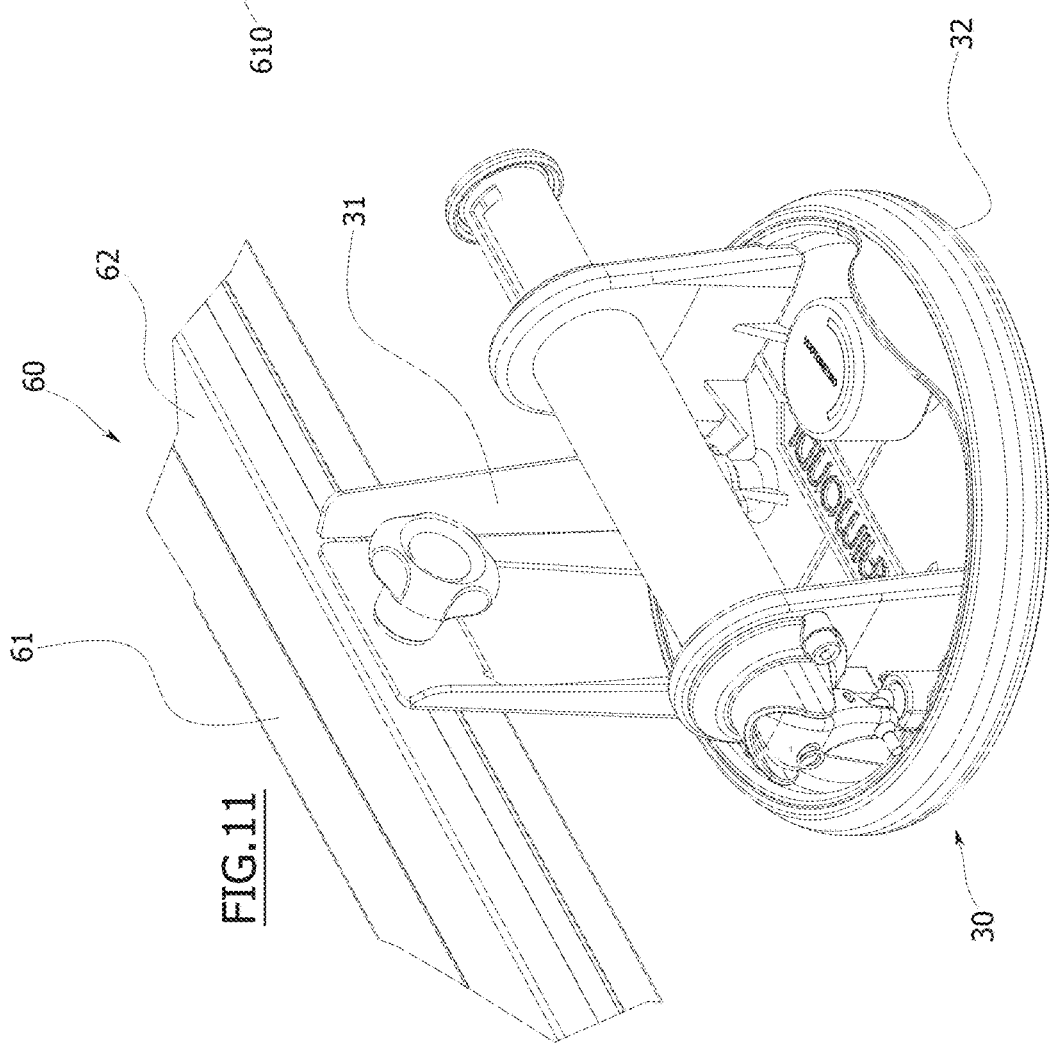
FIG. 11 is an enlargement of detail XI of FIG. 3.
Figure 17:
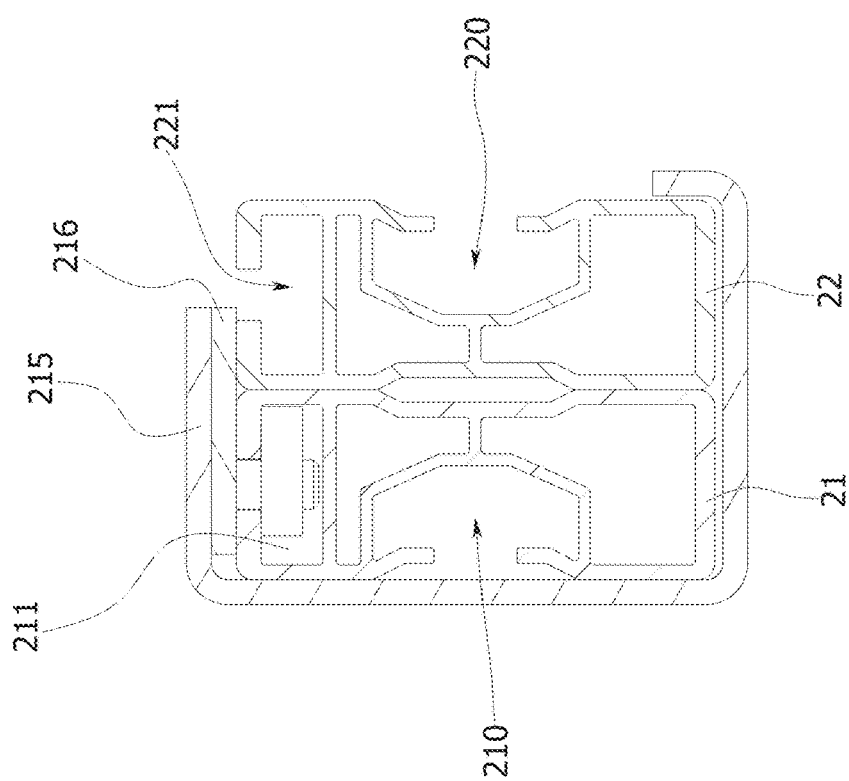
FIG. 17 is a sectional view along the trace of section XVII-XVII of FIG. 5.
Figure 16:
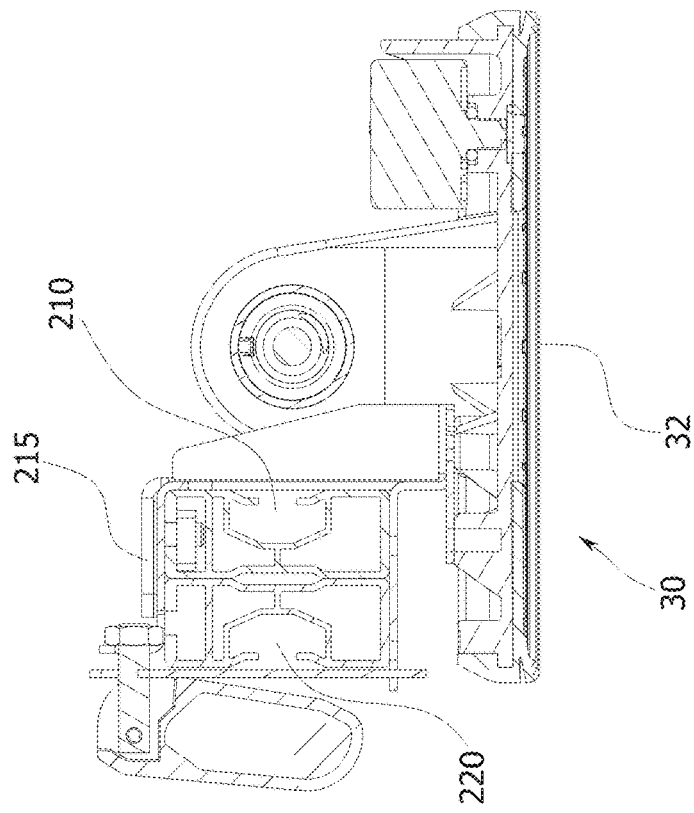
FIG. 16 is a sectional view along the trace of section XVI-XVI of FIG. 5.

In a first possible embodiment (see FIGS. 1 and 2), the gripping device 10 comprises a single longitudinal bar 20, with respective suction gripping units 30 (handles 40 and feet 50), as described above.

In a second possible embodiment, not shown in the figures, the gripping device 10 comprises two or more longitudinal bars 20, with respective suction gripping units 30 (handles 40 and feet 50), as described above, e.g. the same as one another (and unconstrained to one another).

For example, the longitudinal bars 20 are used parallel to one another or twisted (i.e. with substantially incident longitudinal axes A), so that the respective suction cups 42 (coplanar) adhere removably to the visible surface of the (same) sheet-shaped element L.

Preferably but not necessarily it is possible to arrange the pair of longitudinal bars so that the respective suction gripping units 40 (i.e. the suction cups 42 thereof) and the respective handles 40 (i.e. the hand grips 43 thereof) are opposing each other, i.e. external with respect to the longitudinal bars 20.

The gripping device 10, in this second embodiment, is therefore comprised of two longitudinal bars 20 adjacent with respect to the flanking direction B (perpendicular to the longitudinal axis A of the longitudinal bars 20 and parallel to the plane defined by the suction cups 42 i.e. the plane defined by the surface to be taken of the sheet-shaped element L) and, for example, parallel to one another or however positionable according to requirements, so that the suction gripping units 30 of both the longitudinal bars 20 are gripped on a visible surface of a single sheet-shaped element L.

In a third possible embodiment, shown in FIGS. 3-17, the gripping device 10 comprises two (or more) longitudinal bars 20, with respective suction gripping units 30 (handles 40 and feet 50), as described above, e.g. the same as one another and one or more connecting and support crossbars 60 between the two longitudinal bars).

Preferably but not necessarily it is possible to arrange the pair of longitudinal bars so that the respective suction gripping units 40 (i.e. the suction cups 42 thereof) and the respective handles 40 (i.e. the hand grips 43 thereof) are opposing each other, i.e. external with respect to the longitudinal bars 20.

Furthermore, in such third embodiment, the gripping device 10 comprises a crossbar 60 connected to each longitudinal bar 20 of the pair of longitudinal bars 20. For example, the crossbar 60 is arranged substantially squared with respect to the pair of longitudinal bars 20 that it joins or variously inclined according to the mutual inclination of the longitudinal bars 20, as will be better described below.

Preferably, the crossbar 60 has overall a longitudinal axis thereof substantially parallel to the plane defined by the visible surface of the sheet-shaped element L being gripped and perpendicular or variously inclined (not parallel) to the longitudinal axis A of the longitudinal bars 20.

The crossbar 60 is placed on the same side as the longitudinal bars 20 i.e. above them. In other words, the crossbar 60 is placed on the distal part of the sheet-shaped element L being gripped, i.e. distal from the suction cups 42 of the suction gripping units 40 (in practice the crossbar 60 surmounts the longitudinal bars 20 when the gripping device 10 and the sheet-shaped element L are horizontal). The crossbar 60 is for example adjustable in length, as will be better described below.

The crossbar 60 comprises a main bar 61 having a respective longitudinal axis and a (single) extension bar 62 having a respective longitudinal axis parallel to the longitudinal axis of the main bar 61.

The longitudinal axes of the main bar 61 and of the extension bar 62 define overall the longitudinal axis of the crossbar 60.

The main bar 61 and the extension bar 62 are flanked to one another with respect to a mutual flanking direction perpendicular to their longitudinal axis (and parallel to the lying plane of the sheet-shaped element L—i.e. of the visible surface thereof—in use).

The main bar 61 and the extension bar 62 are defined, individually, by longitudinal profiles, for example substantially rigid (not deformable by bending or torsion under the actual use work cycles of the gripping device 10).

The main bar 61 has a substantially quadrangular section, e.g. rectangular, constant for the entire length.

For example, the main bar 61 is obtained by extrusion of a metal material, e.g. a light alloy (such as aluminium for example), and is for example hollow inside (i.e. it has an axial cavity for the entire extension, possibly provided with internal stiffening septa along the entire extension).

Preferably, therefore, the main bar 61 has a pair of lateral walls (substantially parallel to one another), e.g. perpendicular in use to the visible surface of the sheet-shaped element L when gripped, and a pair of base walls (substantially parallel to one another) squared and adjacent to the lateral walls, which are in use parallel to the visible surface of the sheet-shaped element L when gripped.

The main bar 61 has, at a first lateral wall thereof, a hollow 610, e.g. with a substantially dovetail or T-shaped cross section, with an entire longitudinal extension. The hollow 610 is defined at the first longer lateral wall of the main bar 61.

A second lateral wall, opposite the first wall having the hollow 610, for example, comprises a shaped profile, e.g. along the entire longitudinal extension.

Said shaped profile comprises, for example, at least one overhanging tooth along the entire extension and at least one (homologous) recessed hollow along the entire extension, parallel to one another.

The main bar 61 for example can comprise one or more caps each adapted to close an axial end of the main bar 61 itself, or of the axial cavity thereof.

The extension bar 62 is for example completely similar (identical) to the main bar 61.

Preferably, the extension bar 62 has the same length as the main bar 61, e.g. it has the same shape and same total dimensions.

For example, the extension bar 62 has a substantially quadrangular section, e.g. rectangular, constant for the entire length.

Preferably, the extension bar 62 is obtained by extrusion of a metal material e.g. a light alloy (such as aluminium for example), and is for example hollow inside (i.e. it has an axial cavity along the entire extension, possibly provided with internal stiffening septa along the entire extension).

Therefore, the extension bar 62 has a pair of lateral walls (substantially parallel to one another), e.g. perpendicular in use to the visible surface of the sheet-shaped element L when gripped, and a pair of base walls (substantially parallel to one another) squared and adjacent to the lateral walls, which are in use parallel to the visible surface of the sheet-shaped element L when gripped.

The extension bar 62 has, at a first lateral wall thereof, a hollow 620, e.g. with a substantially dovetail or T-shaped cross section, with an entire longitudinal extension.

The hollow 620 is defined at the first longer lateral wall of the extension bar 62. A second lateral wall of the extension bar 62, opposite the first wall having the hollow 620, for example, comprises a shaped profile, e.g. along the entire longitudinal extension.

Said shaped profile comprises, for example, at least one overhanging tooth along the entire longitudinal extension and at least one (homologous) recessed hollow along the entire longitudinal extension, parallel to one another.

The extension bar 62 for example can comprise one or more caps each adapted to close an axial end of the extension bar 62 itself, or of the axial cavity thereof.

A spur 63 can be fixed to one of the axial ends of the extension bar 62, being adapted to facilitate the overturning operations of the sheet-shaped element L, e.g. on the longer side thereof or however adapted to act as a fall-prevention security for the sheet-shaped element L being gripped.

The main bar 61 and the extension bar 62 are adjacent to one another (with respect to the mutual flanking direction) so that the second lateral walls opposite the first lateral walls having the hollows 610,620 are substantially in contact with one another (axial rubbing) or at a short distance from one another.

The hollows 610,620 are therefore opposing one another (i.e. open in opposite directions).

In practice, the main bar 61 and the extension bar 62 slide on one another, e.g. defining a prismatic and/or sliding guide connection.

Such connection is defined through the axially sliding engagement of the overhanging tooth of the main bar 62 in the recessed hollow of the extension bar 62 and, at the same time, of the overhanging tooth of the extension bar 62 in the recessed hollow of the main bar 61.

In practice, the main bar 61 and the extension bar 62 are at least partially mutually co-penetrating.

Furthermore, the main bar 61 and the extension bar 62 are symmetrical to one another with respect to a plane of symmetry that is perpendicular to the mutual flanking direction (i.e. perpendicular to the visible surface of the sheet-shaped element L when gripped).

In general, the crossbar 60 can be variously configured so as to be able to vary the length thereof and/or the shape thereof as will appear more clearly below. Preferably, the extension bar 62 of the crossbar 60 is alternatively movable in mutual sliding with respect to the main bar 61 between a closing position, in which the longitudinal dimension thereof is totally contained within the longitudinal dimension of the main bar 61, and an opening position in which the extension bar 62, i.e. an axial end thereof, extends axially selectively from one or the other axial end of the main bar 61.

In practice, in the closing position, the axial dimensions (or axial length) of the crossbar 60 coincide with the axial dimensions (or length) of the main bar 61, i.e. the main bar 61 and the extension bar 62 are adjacent to one another with respect to the mutual flanking direction and the opposite ends of the extension bar 62 do not exceed/extend the respective ends of the main bar 61, i.e. they are substantially arranged coplanar therewith.

Instead, in the opening position, the axial dimensions (or axial length) of the crossbar 60 is greater (or extended) than the axial dimension (or length) of the main bar 61, by an amount equal to the length of the axial stretch of the extension bar 62 that projects axially beyond one of the two axial ends of the main bar 61.

In the embodiment shown, the crossbar 60 as a whole or each of the main bar 61 and the extension bar 62, for example, can be removably associated with each longitudinal bar 20, e.g. by means of a respective interconnection body 70.

The crossbar 60 as a whole or each of the main bar 61 and the extension bar 62 is slidably associated with each longitudinal bar 20 of the pair of longitudinal bars 20 with respect to a direction parallel to the longitudinal axis A of the longitudinal bars 20.

For example, the crossbar 60 as whole or each of the main bar 61 and the extension bar 62 can be locked along the longitudinal bar 20 in any axial position thereof. In practice, each interconnection body 70 is configured to allow the sliding of the crossbar 60 as a whole or each of the main bar 61 and the extension bar 62 along the longitudinal axis A of the respective longitudinal bar 20 and the axial locking in any desired position.

In practice, each connection body 70 is configured to connect the crossbar 60 as a whole or each of the main bar 61 and the extension bar 62 to one of the side members 21,22 of the longitudinal bar 20 and to allow the sliding of the crossbar 60 as a whole or each of the main bar 61 and the extension bar 62 along the longitudinal axis of the respective side member 21,22 and the axial locking in any desired position thereof.

For example, each connection body 70 is positioned to connect the crossbar 60 as a whole or each of the main bar 61 and the extension bar 62 to one of the side members 21,22 in a central portion thereof interposed axially between the external end 213,223 and the guide sleeve 23.

The connection body 70 comprises a support body 71, which is configured as a sleeve and is adapted to mutually constrain the main bar 61 and the extension bar 62 allowing/ assisting a mutual longitudinal translation, i.e. along the longitudinal axis thereof and, therefore, the regulation of the length of the crossbar 60.

The support body 71 may be of the open or closed cross section type, made of one piece or two or more pieces according to the construction requirements, as will be described in more detail below.

The support body 71 comprises a tubular body provided with an axial through cavity having a longitudinal axis substantially parallel (and coinciding) with the longitudinal axis of the crossbar 60 as a whole.

For example, the axial cavity (and/or the tubular body) of the support body 71 has a substantially prismatic shape, e.g. with a quadrangular cross section, e.g. substantially square or rectangular.

The axial cavity of the support body 71 has a cross section that is constant along the entire extension, configured (or having a shape and size such that), both the main body 61 and the extension bar 62 adjacent as described above, i.e. an intermediate section thereof interposed between their opposing ends, can be inserted therein substantially to measure (simultaneously).

The axial length of the support body 71 is decisively contained, i.e. The axial length thereof is substantially equal to the width of the crossbar 60 in the mutual flanking direction of the main bar 61 and the extension bar 62, i.e. the axial length of the support body 71 does not exceed twice said width of the crossbar 60.

The tubular body of the support body 71 is for example a substantially rigid body (not deformable by—longitudinal— bending or torsion under the actual use work cycles of the gripping device 10).

The main bar 61 and the extension bar 62 are both (simultaneously and individually) inserted axially into the axial cavity of the support body 71 with the possibility to run, independently, through relative sliding along the longitudinal direction provided by the longitudinal axis of the axial cavity of the support body 71 for the regulation of the length of the crossbar 60.

For example, between the support body 71 and each of the main bar 61 and the extension bar 62 a mechanical, prismatic type, connection is defined.

Preferably, the main bar 61 is slidable within the support body 71 between two opposing end work positions (defined for example by respective mechanical end stops) and in infinite intermediate positions between them, in which it remains threaded into the support body 71 (if not voluntarily dismounted therefrom).

The extension bar 62, instead, is slidable (freely) within the axial cavity of the support bar 71 in the two sliding directions with the possibility to be extracted axially from the support body 71 as required.

In more detail, the support body 71 is configured to axially lock in any relative axial position with respect to the axial cavity of the support body 71, individually the main bar 61 and/or the extension bar 62 and/or simultaneously the main bar 61 and the extension bar 62.

In particular, the support body 71 comprises a first locking unit configured for the temporary and soluble locking of the axial sliding individually of the main bar 61 with respect to the support body 71 along the longitudinal axis of the support body 71 itself.

The first locking unit comprises a fixing member adapted to cooperate with the hollow 610 of the main bar 61 for locking the relative sliding between the support body 71 and the main bar 61 itself.

In detail, the fixing member comprises a shaped pin (or nut) to which a tie rod is connected (e.g. threaded or not threaded).

The shaped pin is inserted (through a prismatic connection) into the hollow 610 of the main bar 61 with the possibility to slide along the longitudinal axis thereof without being able to be extracted transversally and the tie rod projects transversally from the hollow 610 and is inserted into a through hole made in a lateral wall of the support body 71 facing the lateral wall of the main bar 61 provided with the hollow 610.

The main bar 61 is adapted to be locked (in a temporary and soluble way) axially along the longitudinal axis of the support body 71 through clamping the tie rod, which is provided with a knob or a clamping lever, in the example a cam lever at the end thereof adapted to exert traction on the nut and, therefore, constrain (by friction) the support body 71 and the main bar 61.

The support body 71 then comprises a second locking unit for the temporary and soluble locking of the relative longitudinal sliding of the extension bar 62 (and/or of the crossbar 60 as a whole) along the longitudinal axis of the support body 71 itself. For example, the passage gap of the axial cavity of the support body 71 is variable and can be activated between an enlarged configuration, in which it allows the mutual sliding of the extension bar 62 with respect to the support body 71 (and to the main bar 61 fixed thereto through the first locking unit), and a restricted configuration, in which it prevents or contrasts the mutual sliding of the extension bar 62 and the support body 71 (and of the main bar 61).

The second locking unit is for example rigidly connected to the support body 71. The second locking unit is for example a vice type locking unit, i.e. adapted to clamp as a package (in the transverse direction with respect to the longitudinal axis of the crossbar 60) mutually in a vice arrangement the support body 71, i.e. the tubular body thereof, with one or both bars, in particular the main bar 61 and the extension bar 62.

In the example illustrated, the support body 71, i.e. the tubular body thereof, is made by joining two bodies coupled to one another.

For example, the support body 71 comprises a first shell, e.g. comprising an open C-shaped cross section, and a second shell, e.g. substantially plate shaped, adapted to close the open section of the first shell.

The first shell and the second shell have respective ears adapted to be mutually flanked for the fixing, through clamping members, e.g. threaded, of the first shell to the second shell.

In the example the first shell and the second shell each have an ear at each contact end between the shells.

For example, each ear of the first shell has at least one through hole adapted to be aligned with the through axis thereof at a through hole made in the respective ear of the second shell.

A clamping member is inserted into the through holes.

In such first embodiment, the clamping member comprises a threaded pin inserted into the through holes, axially locked, e.g. by means of a nut or by screwing, to one of the through holes, and provided with an activation member, e.g.

a prismatic head and/or a cam lever associated with an end of the threaded pin distal from the through hole and to which the threaded pin is locked.

One of the two ears of each shell is constrained by means of clamping members having a prismatic head (e.g. the lower ears), whereas the other of the ears of each shell is constrained by means of clamping members having a cam lever.

The cam lever of the second locking unit is, for example, placed at the lateral wall of the support body 71 opposite the one that supports the cam lever of the first locking unit.

The clamping member can be operated (manually) for the mutual release and clamping of the first shell and the second shell, so as to bring the axial cavity of the support body 71 respectively into its enlarged configuration, wherein it allows the axial sliding of the extension bar 62 (and possibly of the main bar 62 if released from the first locking unit) inside it, and into its restricted position, wherein it prevents (by friction) or contrasts the sliding of the extension bar 62 (and/or of the main bar 61) inside it.

In this configuration the second locking unit is therefore defined by the same tubular body of the support body 71, which acts as a vice, whose jaws are the first shell and the second shell.

In general, the support body 71 can comprise holes or slits to make it lighter. Again, the interconnection body 70 comprises an interconnection bracket 72 adapted to be connected, for example removably, to the longitudinal bar 20. Preferably, the interconnection bracket 72 comprises a first layer adapted to be arranged parallel to the first lateral wall provided with the hollow 210,220 of one of the side members 21,22.

For example, a shaped pin (or nut) can be fixed to the first layer of the interconnection bracket 72 by means of a threaded member that engages a through hole made in the first layer itself, in the example an elongated slot, with longitudinal axis parallel to the hollow 210,220 of the side member 21,22 to which it is fixed and, preferably axially open.

The shaped pin is inserted (by means of a prismatic connection) into the hollow 210,22 of one of the side members 21,22 with the possibility to slide along the longitudinal axis thereof without being able to be extracted transversally and the threaded member projects transversally from the hollow 210,220 of the side member 21,22 and is inserted into the elongated slot.

The first layer of the interconnection bracket 72 can be locked (in a temporary and adjustable way) axially along the longitudinal axis of the respective side member 21,22 by means of clamping of the threaded member, which is provided with a clamping lever or knob, in the example a clamping knob.

The open elongated slot allows quicker removal of the interconnection bracket 72 from the side members 21,22 in the event of having to remove the crossbar 60 therefrom.

It is not excluded that the first layer of the interconnection bracket 72 is not locked in a clamped way, but that it can slide substantially axially freely along the longitudinal axis of the side member 21,22.

Furthermore, the interconnection bracket 72 has a second layer deriving (in a projecting fashion) from the (upper) top of the first layer squared therewith and in fact parallel to the lower base wall of the crossbar 60 and integral with the first layer. In practice, the first layer and the second layer confer a substantially conformation to the interconnection bracket 72.

For example, the second layer defines an (indirect) support surface for the crossbar 60.

The second layer is associated (at the bottom) with the support body 71, as will be better described below.

Preferably, the interconnection body 70 defines overall a hinge joint configured to allow any mutual orientation between the crossbar 60 and the longitudinal bar 20. In detail, the hinge joint comprises a (single) hinge axis C perpendicular to the longitudinal axis of the longitudinal bar A and to a longitudinal axis of the crossbar 60, i.e. substantially perpendicular to the visible surface of the sheet-shaped element L being gripped.

Preferably, the interconnection bracket 72, i.e. the second layer thereof, and the support body 71, i.e. a lower face thereof, are rotatably coupled to one another about the aforesaid hinge axis (parallel both to the second layer and to the lower face thereof).

For example, a hinge pin, defined for example by a threaded bolt, engages a first cylindrical seat made in the lower wall and a second seat made in the second layer. The hinge joint, defined by the rotatable connection between the support body 71 and the interconnection bracket 72, can have a predetermined resistance (non-null or however that can be adjusted/regulated through the action of the threaded bolt) to the mutual spontaneous rotation (obtained by calibrating the friction at stake. For example, such resistance to the mutual spontaneous rotation is configured so as to prevent the spontaneous rotation between the support body 71 and the interconnection bracket 72 about the hinge axis C when not strained by an appropriate circumferential force (voluntary by the operator).

It is not excluded that the hinge joint is, instead, free or that—on the contrary—the interconnection bracket 72 and the support body 71 are fixed to one another without any mutual degree of freedom.

Thanks to the aforesaid interconnection bodies 72 it is possible to keep the longitudinal bars 20 parallel and coplanar to one another and adjacent with respect to the flanking direction B and/or allow, as a function of the shape of the sheet-shaped element L, the longitudinal bars to be used inclined (and coplanar) to one another, i.e. with substantially incident longitudinal axes A.

In the same way, also the crossbars 60 can be arranged with mutually parallel longitudinal axes (and perpendicular to the longitudinal axes of the longitudinal bars 20) or they can alternatively be arranged with mutually incident longitudinal axes (and inclined by any right angle or angle other than a right angle with respect to the longitudinal axes of the longitudinal bars 20).

In an advantageous embodiment, the crossbar 60 as a whole or any one of the main bar 61 and the extension bar 62 can be slidably associated with each longitudinal bar 20 of the pair of longitudinal bars 20 with respect to a direction perpendicular to the longitudinal axis A of the respective longitudinal bar 20 (by means of the slidable connection between the first layer of the interconnection bracket 72 and the hollow 210,220 of the respective side member 21,22.

In particular, the crossbar 60 as a whole and each of the main bar 61 and the extension bar 62 can be associated with each longitudinal bar 20 with the possibility to slide with respect to a direction perpendicular to the plane defined by the suction cups 32, i.e. the plane defined by the upper (visible) surface of the sheet-shaped element L.

Each crossbar 60 as whole or each of the main bar 61 and the extension bar 62 is fixed to a longitudinal bar 20 by means of a respective interconnection body 70 as described above.

The gripping device 10 comprises at least one further suction gripping member 30, i.e. a fourth suction gripping member 30, connected to the crossbar 60 as a whole or to one from among the main bar 61 and the extension bar 62, preferably to the extension bar 62.

The further fourth suction gripping member 30 comprises a support frame 31 that can be anchored to the crossbar 60 i.e. to the extension bar 62, and at least one suction cup 32 fixed to the support frame 31.

For example, to improve the lifting operations of the sheet-shaped element L—especially when it is heavy and/or flexible—it is possible to provide for the suction cup 32 to be associated in an oscillating way (with contained oscillation) with respect to the crossbar 60, e.g. with respect to an oscillation axis parallel to the longitudinal axis A of the longitudinal bar 20 or with respect to an oscillation axis perpendicular to the longitudinal axis A (e.g. parallel to the flanking direction B) i.e. parallel to the longitudinal axis of the crossbar 60 or a combination of oscillations.

In this way, the suction cup 32 can follow the different orientations or folds or curves of the sheet-shaped element L remaining with its gripping surface always parallel to the gripping surface of the sheet-shaped element L.

For example, the suction cup 32 can be associated in an oscillating (tilting) way with respect to the support frame 31, which is rigidly connected to the crossbar 60; it is not excluded that it may be on the contrary the support frame 31 associated in an oscillating way with the crossbar 60 and the suction cup 32 fixed rigidly to the support frame 31.

For example the suction cup 32 can be variously configured in the oscillating or fixed configuration with respect to the crossbar 60 by the clamping of oscillation locking means, e.g. soluble, such as threaded members.

The further fourth suction gripping member 30 can comprise one (as us rated) or more suction cups in groups.

The further fourth suction gripping member 30 can be for example provided with a respective vacuum pump and a respective vacuum gauge.

The fourth suction gripping member 30 can be fixed to the crossbar 60, i.e. of the main bar 61, in any axial position thereof as will appear more clearly below, e.g. at the centreline plane thereof or near to an end of the crossbar 60, i.e. of the main bar 61, according to the gripping requirements.

The support frame 31 comprises a fixing leg adapted to flank the first lateral wall provided with the hollow 610 of the main bar 61.

A shaped pin (or nut) is fixed to the fixing leg by means of a threaded member. The shaped pin is inserted (by means of a prismatic connection) into the hollow 610 of the main bar with the possibility to slide along the longitudinal axis thereof without being able to be extracted transversally and the threaded member projects transversally from the hollow 61 and is connected to the fixing leg.

The support frame 31 is adapted to be locked (in a temporary and adjustable way) axially along the longitudinal axis of the crossbar 60 i.e. of the main bar 61, by means of clamping of the threaded member, which is provided with a clamping knob or nut or lever, in the example a clamping knob.

The support frame 31 therefore supports the suction cup 32, so that it projects below a plane defined by the lower base wall (turned towards the sheet-shaped element L during operation) of the crossbar 60, i.e. of the main bar 61.

The suction cup 32 of the further suction gripper member 30 is substantially coplanar with the suction cups 32 of each suction gripping member 30 (first, second and/or third) of the gripping device 10, i.e. they have gripping surfaces that are coplanar to one another and lying on a plane parallel to the longitudinal axes A of the longitudinal bars 20, so as to be able to all adhere to the (same) upper surface of a sheet-shaped element L.

In the case in which the suction cups 32 of each suction gripping member 30 (first, second, third and fourth) are associated in an oscillating/tilting way with the longitudinal bar 20 and with the crossbar 60, as described above, they are coplanar when the surface of the sheet-shaped element L is planar or when they are free; in the event that they adhere to a structured/undulated surface the suction cups 32 all pertain to such surface.

In the example, the gripping device 10 comprises a pair of crossbars 60 as described above, e.g. analogous or identical to one another.

For example, the crossbars of the pair of crossbars 60 are parallel to one another (as illustrated) or variously inclined, e.g. according to the mutual inclination of the longitudinal bars 20 by means of the hinge joint defined by each interconnection body 70.

For example, a crossbar 60 of the pair of crossbars 60 is connected, by means of two interconnection bodies 70 respectively to the pair of first side members 21, e.g. at a central axial section thereof interposed axially between the external end 213 and the guide sleeve 23.

Another crossbar 60 of the pair of crossbars 60 is connected, by means of two interconnection bodies 70 respectively to the pair of second side members 22, e.g. at a central axial section thereof interposed axially between the external end 223 and the guide sleeve 23.

In light of the above, the operation of the gripping device 10 is as follows.

Once the gripping device 10 has been assembled, e.g. the longitudinal bar(s) 20 and possibly the longitudinal bar(s) 20 with the crossbars 60 as described above, it is possible to arrange the suction gripping units 30 with the suction cups 32 resting on the visible surface of a sheet-shaped element L.

In particular, it is possible to configure the gripping device 10 so that it is totally contained within the dimensions of the sheet-shaped element L, e.g. having a length of the longitudinal bar(s) 20 and of the crossbars 60 (where provided) such as not to exceed the (maximum) length of the sheet-shaped element L.

In this way the longitudinal bar(s) 20 can enter (vertically) into the case C without interfering with the walls.

When the suction cups 32 are resting on the upper surface of the sheet-shaped element L it is possible to activate them so that they create the vacuum and each one adheres stably to the sheet-shaped element L.

With the gripping device 10 in the gripping conformation, the sheet-shaped element L is lifted, e.g. with two people, activating the gripping device 10 through the handles 40.

For example, in this first step, in which the longitudinal bars 20 are inside the case C, the handles 40 and the feet 50 are in the retracted position.

When the sheet-shaped element L is extracted from the case C it is possible to bring the handles 40 (and the feet 50) into the extracted position to facilitate the transport of the sheet by means of the gripping device 10 and comfort for the operators.

To perform the laying operation, e.g. vertical, of the sheet-shaped element L it is possible to use the gripping device 10 to help.

In particular, it is possible to lock the feet 50 (e.g. of one end of the gripping device 10, i.e. both ends placed on the same side of the longitudinal bars 20) in an extracted position thereof.

With the feet in the extracted position, the sheet-shaped element L is overturned towards the vertical wall with which it is to be associated, e.g. through an adhesive, leaving the sheet-shaped element L vertical resting on the feet 50 in the extracted position.

When the laying surface (opposite the gripping surface of the suction cups 32) adheres to the wall (with the adhesive still wet) it is possible to activate the feet 50 towards the retracted position, e.g. it is possible to lock only the feet 50 and the sheet-shaped element L under the action of the weight force will move downwards bringing the gripping device 20 with it and making the feet 50 retract towards the external end 213,223 of the respective side member 21,22.

When the sheet-shaped element L is extracted from the case C it is also possible to lock the sliding of the extension bar 62 so that it is brought into one of the two possible opening positions, in which they project (on the same side) by an axial section with respect to the respective main bars 61.

In such opening position, for example, the extension bar 62 projects laterally with respect to the sheet-shaped element L being gripped, allowing and facilitating the overturning on the long side and the resting on the ground of the gripping device 10.

In fact, to perform the laying operation, e.g. horizontal, of the sheet-shaped element L it is possible to use the extension bars 62 of the gripping device 10 to help. In particular, it is possible to lock the extension bars 62 into said opening position (both placed on the same side).

With the extension bars 62 in such opening position the sheet-shaped element L is overturned towards the vertical wall with which it is to be associated, e.g. through an adhesive, leaving the sheet-shaped element L horizontal resting on the extension bars 62 in such opening position.

When the sheet-shaped element L is fixed to the wall (or floor) it is possible to remove the suction cups 32 from the sheet-shaped element L and thus release the gripping device 10 for a new use.

The invention thus conceived is susceptible to several modifications and variations, all falling within the scope of the inventive concept.

For example, it is possible to envisage that one or more of the side members 21,22 (of each longitudinal bar 20) can be associated with a further guide sleeve 23 into which a further complementary side member 22,21 is inserted for the overall extension of the longitudinal bar 20.

Moreover, all the details can be replaced by other technically equivalent elements. In practice, the materials used, as well as the contingent shapes and sizes, can be whatever according to the requirements without for this reason departing from the scope of protection of the following claims.

The invention claimed is:

1. A gripping device for sheet-shaped elements comprising:
   a pair of longitudinal bars, wherein each longitudinal bar of the pair of longitudinal bars is:
   individually adjustable in length,
   formed by a first side member and a second side member parallel and at least partially flanked to the first side member, and
   provided with a plurality of suction gripping members connected along a longitudinal axis of the longitudinal bar; and
   at least one longitudinal crossbar connected transversally to the pair of longitudinal bars,
   wherein the crossbar is rotatably connected to each longitudinal bar about a respective hinge axis perpendicular to the longitudinal axes of the longitudinal bars and a longitudinal axis of the crossbar.

2. The gripping device according to claim 1, further comprising a pair of hinge joints, wherein each hinge joint rotatably connects the crossbar to the respective longitudinal bar of the pair of longitudinal bars about the hinge axis.

3. The gripping device according claim 2, wherein each hinge joint comprises an interconnection bracket removably fixed to the respective longitudinal bar and a support body removably fixed to the crossbar, wherein the support body is hinged to the interconnection bracket with the possibility to oscillate about the hinge axis perpendicular to the longitudinal axis of the longitudinal bar and to the longitudinal axis of the crossbar.

4. The gripping device according to claim 1, wherein the crossbar comprises a main bar connected transversally to the pair of longitudinal bars and an extension bar also connected transversally to the pair of longitudinal bars, wherein the extension bar is parallel to the main bar and is slidably coupled to the main bar itself between a closing position, in which its longitudinal dimension is totally contained within a longitudinal dimension of the main bar and an opening position in which the extension bar axially projects selectively from one or another axial end of the main bar.

5. The gripping device according to claim 4, wherein the crossbar comprises a main bar connected transversally to the pair of longitudinal bars and an extension bar also connected transversally to the pair of longitudinal bars, wherein the extension bar is parallel to the main bar and is slidably coupled to the main bar itself, and wherein the extension bar is slidably associated with the support body of each hinge joint.

6. The gripping device according to claim 4, wherein the extension bar is adjacent to the main body and slidably associated therewith.

7. The gripping device according to claim 1, wherein the first side member has, at an internal end thereof facing the second side member, a first retaining body configured to embrace at least partially an axial portion of the second side member and wherein the second side member has, at an internal end thereof facing the first side member, a second retaining body configured to embrace at least partially an axial portion of the first side member.

8. The gripping device according to claim 7, wherein the longitudinal bar comprises a guide sleeve, wherein the first side member and the second side member are axially inserted inside the guide sleeve, being able to mutually slide in a longitudinal direction in order to ad-just the length of the longitudinal bar.

9. The gripping device according to claim 7, wherein at least a first sliding skid can be interposed between the first retaining body and the second side member and at least one second sliding skid is inter-posed between the second retaining body and the first side member.

10. The gripping device according to claim 1, wherein the suction gripping members are all arranged on the same side of the respective longitudinal bar to which they are fixed.

11. A gripping device for sheet-shaped elements comprising:
    at least one longitudinal bar adjustable in length and provided with a plurality of suction gripping members connected along a longitudinal axis of the longitudinal bar, wherein the longitudinal bar comprises a first side member and a second side member parallel and at least partially flanked to the first side member,
wherein the first side member has, at an internal end thereof facing the second side member, a first retaining body configured to embrace at least partially an axial portion of the second side member, and
wherein the second side member has, at an internal end thereof facing the first side member, a second retaining body configured to embrace at least partially an axial portion of the first side member.

* * * * *